United States Patent [19]
Carey, II et al.

[11] Patent Number: 5,491,036
[45] Date of Patent: *Feb. 13, 1996

[54] COATED STRIP

[75] Inventors: Jay F. Carey, II, Follansbee, W. Va.; Mehrooz Zamanzadeh, Pittsburgh, Pa.

[73] Assignee: The Louis Berkman Company, Steubenville, Ohio

[*] Notice: The term of this patent shall not extend beyond the expiration date of Pat. No. 5,354,624.

[21] Appl. No.: 402,925

[22] Filed: Mar. 13, 1995

Related U.S. Application Data

[63] Continuation-in-part of Ser. No. 175,523, Dec. 30, 1993, Pat. No. 5,401,586, and a continuation-in-part of Ser. No. 165,085, Dec. 10, 1993, Pat. No. 5,397,652, and a continuation-in-part of Ser. No. 380,372, Jan. 30, 1995, which is a continuation of Ser. No. 153,026, Nov. 17, 1993, Pat. No. 5,395,703, which is a division of Ser. No. 858,662, Mar. 27, 1992, abandoned, said Ser. No. 175,523 is a continuation-in-part of Ser. No. 154,376, Nov. 17, 1993, abandoned, which is a continuation of Ser. No. 42,649, Apr. 5, 1993, abandoned, said Ser. No. 165,085 is a continuation-in-part of Ser. No. 101, Jan. 4, 1993, abandoned, which is a continuation-in-part of Ser. No. 858,662.

[51] Int. Cl.$^6$ .............................. B32B 15/18; B32B 15/20
[52] U.S. Cl. ...................... 428/647; 428/646; 428/648; 428/658; 428/659; 428/660; 428/666; 428/667; 428/674; 428/675; 428/685; 428/939
[58] Field of Search ............................. 428/648, 676, 428/685, 644, 647, 939, 659, 674, 658, 675, 660, 666, 680, 667; 420/558, 559, 560, 561, 524, 517

[56] References Cited

U.S. PATENT DOCUMENTS

| | | | |
|---|---|---|---|
| 84,205 | 11/1869 | Mills | 428/648 |
| 1,989,925 | 2/1935 | Hoover | 148/6 |

(List continued on next page.)

FOREIGN PATENT DOCUMENTS

| | | |
|---|---|---|
| 261078 | 3/1988 | European Pat. Off. . |
| 480122 | 4/1992 | European Pat. Off. . |

(List continued on next page.)

OTHER PUBLICATIONS

Great Britain Search Report dated May 22, 1995, for GB 9504/12.2.
Metals Handbook, The American Society for Metals, "Metallic Coatings", pp. 703–721; Surface Treatments pp. 725–732; Tin Alloys pp. 1063–1076; Zinc and Zinc Alloys pp. 1077–1092, 1958, no month.
Van Nostrand's Scientific Encyclopedia, 6th Edition, vol. 1, 1983; pp. 94–96—Definition of "Alloys"; p. 1322—Definition of Galvanizing, no month.
Van Nostrand's Scientific Encyclopedia, 6th Edition, vol. 11, 1983, pp. 2832–2834—Defintiion of "Tin"; pp. 3059–3062—Definition of Zinc, no month.
English Translation of Kokai Patent Application No. SHO 49 (May 1974) 54230 "Properties and Selection: Nonferrous Alloys and Special–Purpose Materials", Metals Handbook, 10th Ed., vol. 2, pp. 1166–1168, no date.
McGraw–Hill Encyclopedia of Science & Technology, 6th Edition, 1987, pp. 35–37; pp. 44–46, no month.
McGraw–Hill Encyclopedia of Science & Technology, 6th Edition, 1987, pp. 368–372 no month.

(List continued on next page.)

Primary Examiner—John Zimmerman
Attorney, Agent, or Firm—Vickers, Daniels & Young

[57] ABSTRACT

A corrosion-resistant metal strip and method for making the same which is essentially lead free and is not highly reflective. The coating on the metal strip is a metallic coating comprised of tin and a very low weight percentage of lead. The coating alloy may also include antimony, bismuth, copper, zinc to improve the coating process and/or improve the properties of the tin coating. A metal layer may also applied to the surface of the metal strip prior to applying the metallic alloy coating.

38 Claims, 5 Drawing Sheets

U.S. PATENT DOCUMENTS

| | | | |
|---|---|---|---|
| 2,210,593 | 11/1940 | McCullough | 75/175 |
| 2,258,327 | 10/1941 | Kramer | 29/181 |
| 2,374,926 | 5/1945 | Fink | 117/51 |
| 2,533,048 | 12/1950 | Rodgers | 117/52 |
| 2,703,766 | 3/1955 | Ellis | 117/114 |
| 2,806,622 | 9/1957 | Leirer | 220/5 |
| 3,012,310 | 12/1961 | Godfrey | 29/196.4 |
| 3,058,856 | 10/1962 | Miller | 148/16 |
| 3,105,022 | 9/1963 | Boggs | 204/37 |
| 3,231,127 | 1/1966 | Virzi | 220/52 |
| 3,630,792 | 12/1971 | Smyth | 148/6.3 |
| 3,728,144 | 5/1973 | Poucke | 117/51 |
| 3,791,801 | 2/1974 | Ariga et al. | 29/196.5 |
| 3,860,438 | 1/1975 | Shoemaker | 117/50 |
| 3,962,501 | 6/1976 | Ohbu et al. | 427/433 |
| 3,966,564 | 6/1976 | Hyner et al. | 204/43 |
| 4,015,950 | 4/1977 | Galland et al. | 428/648 |
| 4,049,481 | 9/1977 | Morisaki | 156/151 |
| 4,152,471 | 5/1979 | Schnedler et al. | 427/310 |
| 4,177,326 | 12/1979 | Windal et al. | 428/645 |
| 4,184,928 | 1/1980 | Hoije | 204/43 |
| 4,190,504 | 2/1980 | Usui | 204/35 |
| 4,202,921 | 5/1980 | Enghag | 427/406 |
| 4,216,250 | 9/1980 | Nakayama et al. | 427/289 |
| 4,321,289 | 3/1982 | Bartsch | 427/287 |
| 4,330,574 | 5/1982 | Pierson et al. | 427/319 |
| 4,357,027 | 11/1982 | Zeitlow | 280/5 |
| 4,758,407 | 7/1988 | Ballentine et al. | 420/560 |
| 4,778,733 | 10/1988 | Lubrano et al. | 428/647 |
| 4,806,309 | 2/1989 | Tulman | 420/562 |
| 4,814,049 | 3/1989 | Helton et al. | 204/44.2 |
| 4,862,825 | 9/1989 | Fontaine | 118/63 |
| 4,879,096 | 11/1989 | Naton | 420/561 |
| 4,883,723 | 11/1989 | Kilbane et al. | 428/653 |
| 4,934,120 | 6/1990 | Boyd | 52/518 |
| 4,969,980 | 11/1990 | Yoshioka et al. | 204/28 |
| 4,987,716 | 1/1991 | Boyd | 52/520 |
| 4,999,258 | 3/1991 | Wake et al. | 428/632 |
| 5,023,113 | 6/1991 | Boston et al. | 427/320 |
| 5,114,799 | 5/1992 | Wake et al. | 428/632 |
| 5,175,026 | 12/1992 | Bertol et al. | 427/307 |
| 5,202,002 | 4/1993 | Tsuchinaga et al. | 204/145 |
| 5,203,985 | 4/1993 | Nishimura et al. | 205/193 |
| 5,314,758 | 5/1994 | Carey, II et al. | 428/648 |
| 5,354,624 | 10/1994 | Carey, II | 428/647 |

FOREIGN PATENT DOCUMENTS

| | | |
|---|---|---|
| 746337 | 5/1933 | France . |
| 1457769 | 9/1966 | France . |
| 2052324 | 3/1971 | France . |
| 2281995 | 8/1974 | France . |
| 2554831 | 11/1983 | France . |
| 2713196 | 10/1978 | Germany . |
| 4218219 | 9/1967 | Japan . |
| 49-54230 | 5/1974 | Japan . |
| 58-48694 | 3/1983 | Japan . |
| 58-221283 | 12/1983 | Japan . |
| 59-41430 | 3/1984 | Japan . |
| 59-96238 | 6/1984 | Japan . |
| 60-208465 | 10/1985 | Japan . |
| 1259153 | 10/1989 | Japan . |
| 528558 | 10/1932 | United Kingdom . |
| 581604 | 10/1946 | United Kingdom . |
| 626826 | 7/1949 | United Kingdom . |
| 709163 | 5/1954 | United Kingdom . |
| 796128 | 6/1958 | United Kingdom . |
| 1008316 | 10/1965 | United Kingdom . |
| 1040916 | 9/1966 | United Kingdom . |
| 1074852 | 7/1967 | United Kingdom . |
| 1143107 | 2/1969 | United Kingdom . |
| 1178816 | 1/1970 | United Kingdom . |
| 1194751 | 6/1970 | United Kingdom . |
| 1277523 | 6/1972 | United Kingdom . |
| 1361942 | 7/1974 | United Kingdom . |
| 1439774 | 6/1976 | United Kingdom . |
| 1513002 | 6/1978 | United Kingdom . |
| 1517454 | 7/1978 | United Kingdom . |
| 2005307 | 4/1979 | United Kingdom . |
| 2022158 | 12/1979 | United Kingdom . |
| 2055402 | 3/1981 | United Kingdom . |
| 1588808 | 4/1981 | United Kingdom . |
| 2099857 | 1/1982 | United Kingdom . |
| 2087931 | 6/1982 | United Kingdom . |
| 2117414 | 10/1983 | United Kingdom . |
| 546179 | 11/1991 | United Kingdom . |
| 2265389 | 9/1993 | United Kingdom . |
| 2276887 | 10/1994 | United Kingdom . |

OTHER PUBLICATIONS

McGraw–Hill Encyclopedia of Science & Technology, 6th Edition, 1987, pp. 618–623 no month.

Abstract of Great Britain patent 2,055,158, no date.

Standard Specification for Solder Metal, pp. 1 & 9, no date.

McGraw–Hill Encyclopedia of Science & Technology, 6th Edition, 1987, p. 517, no month.

Metals Handbook, 9th Ed., vol. 5, Picking of Iron & Steel pp. 68–82, Hot Dip Galvanized Coatings pp. 323–332; Hot Dip Tin Coating & Steel & Cast Iron pp. 351–355; Hot Dip Lead Alloy Coating Steel pp. 358–360, Cleaning & Finishing of Stainless Steel pp. 551–554, published 1982, no month.

Handbook of Stainless Steels, Chapter 35, 1977, J. M. Bernstein, pp. 35–1–35–16, no month.

"Tinning of Steel", Robert J. Nekervis & Bruce W. Gonser, pp. 709–711, no date.

"Zinc Coatings", W. M. Peirce, pp. 712,714, no date.

"Tin–Zinc Alloy Coatings", Materials & Methods, pp. 1248–1250, no date.

Metal Coatings, p. 35, McGraw–Hill Encyclopedia of Scientic & Technology 6th Edition, vol. II, no date.

Federal Specification QQ–T–201F, 12 Nov. 1986, "Terne Plate, for Roofing and Roofing Products" pp. 1–8.

Hot Dip Tin Coating of Steel and Cast Iron, Metals Handbook, 9th Ed., vol. 5, 1983, pp. 351–355, no month.

"Surface Cleaning, Finishing, And Coating", Metals Handbook, 9th Ed., vol. 5 1983, pp. 709–712, 655–659, no month.

"The Pickling of Iron and Steel Products", Surface Treatments, McCollam, C. H. Warrick, D. L., pp. 725–729, no date.

Soldering Manual, American Welding Society, 1959, pp. 21–23, no month.

"Tin and Tin Alloys", Gosner, Bruce W., pp. 1063–1070, no date.

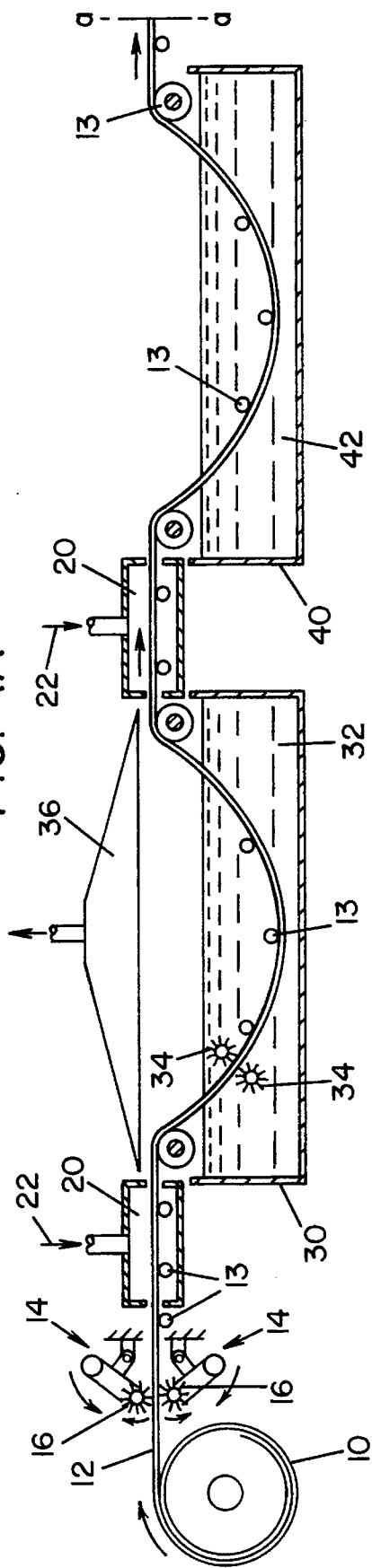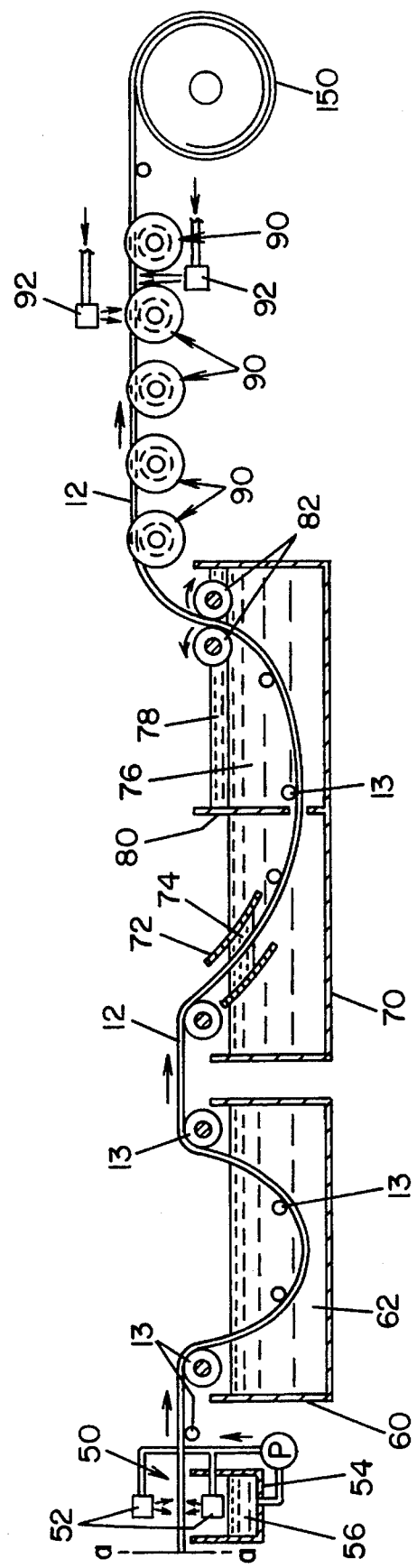
FIG. 1A

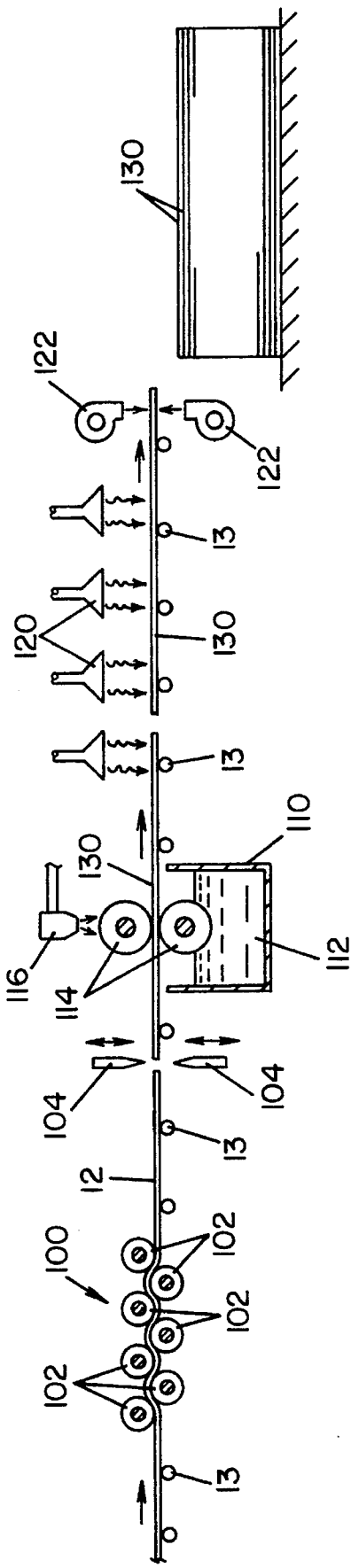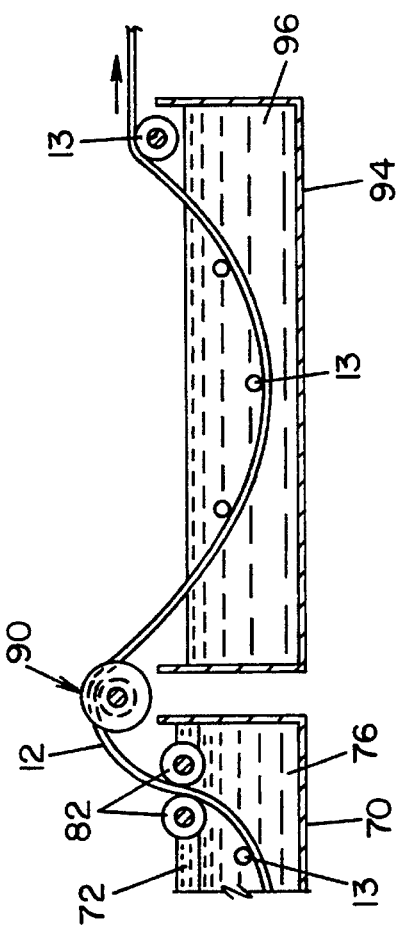

FIG. 8
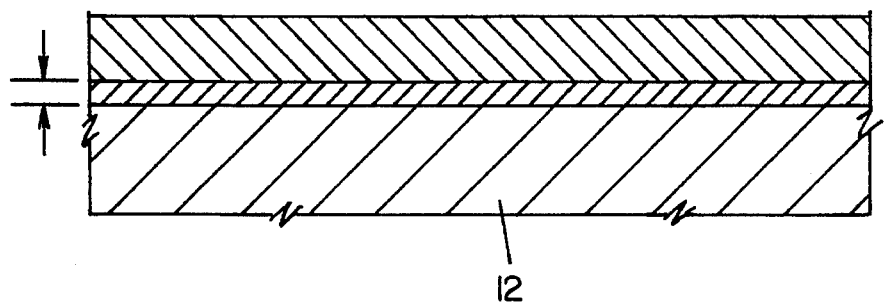
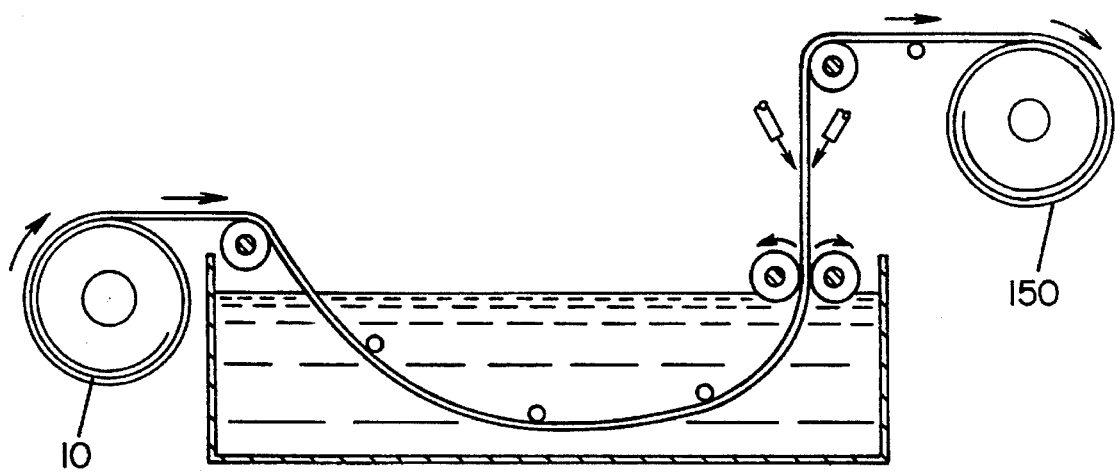
FIG. 9

COATED STRIP

This application is a continuation-in-part of co-pending application Ser. No. 380,372 filed Jan. 30, 1995 which is in turn a continuation of U.S. Ser. No. 153,026, filed Nov. 17, 1993, now U.S. Pat. No. 5,395,703 which in turn a is divisional of abandoned application Ser. No. 858,662 filed Mar. 27, 1992. This application is also a continuation-in-part of co-pending application Ser. No. 175,523 filed Dec. 30, 1993, now U.S. Pat. No. 5,401,586, which in turn is a continuation-in-part of abandoned application Ser. No. 154,376 filed Nov. 17, 1993 which in turn is a continuation of abandoned application Ser. No. 042,649 filed Apr. 5, 1993. This application is further a continuation-in-part of co-pending application Ser. No. 165,085 filed Dec. 10, 1993, now U.S. Pat. No. 5,397,652, which in turn is a continuation-in-part of abandoned application Ser. No. 000,101 filed Jan. 4, 1993 which in turn is a continuation-in-part of abandoned application Ser. No. 858,662 filed Mar. 27, 1992.

The present invention relates to the art of coated metal strip and more particularly to a metal strip coated with a hot dip environmentally friendly alloy coating which provides long life to the metal strip.

INCORPORATED BY REFERENCE

As background material so that the specification need not specify in detail what is known in the art, Federal Specification No. QQ-T-201F and an article entitled "The Making, Shaping and Treating of Steel"; *U.S. Steel Corporation,* 1957, pp. 655–659, *Sci. Lib. Coll* No. TN T30 C16, 1957 are incorporated herein by reference and made part hereof. Assignee's U.S. Pat. Nos. 4,987,716 and 4,934,120 are incorporated herein by reference to illustrate metal roofing systems of the type to which this invention can be used. Co-pending application Ser. No. 373,533 filed Jan. 17, 1995, now U.S. Pat. No. 5,455,122, is incorporated herein by reference to illustrate petroleum receptacles of the type to which this invention can be used. U.S. Pat. No. 5,203,985 is incorporated herein by reference to illustrate a prior art electroplating process for the plating of nickel on a carbon steel strip. Assignee's U.S. Pat. Nos. 5,314,758; 5,354,624; 5,395,702; 5,395,703; 5,397,652 and 5,401,586 and co-pending application Ser. No. 260,333 filed Jun. 15, 1994, now U.S. Pat. No. 5,427,522; application Ser. No. 341,365 filed Nov. 17, 1994; application Ser. No. 347,261 filed Nov. 30, 1994 and application Ser. No. 373,533 filed Jan. 17, 1995 are incorporated herein by reference to illustrate a pre-treatment process for the metal strip prior to coating, to illustrate a post-treatment process for the coated strip to expose a corrosion-resistant intermetallic layer, and to illustrate various types of tin containing alloy compositions.

BACKGROUND OF THE INVENTION

The present invention relates to the art of coated metal strip such as strip used for architectural materials, gasoline tanks and filter housings; however, the invention has broad applications and relates to various coating alloy compositions based upon tin or tin and zinc and several novel method concepts used therein such as continuous hot dipping, pre-treatment of the metal strip prior to hot dip coating, applying an intermediate metal layer prior to hot dip coating and post-treating the coated metal strip. This invention is particularly applicable to the pre-treating of thin stainless steel strip by applying an ultra thin layer of a metal, such as nickel, onto the strip as the strip is continuously progressing toward a molten bath of coating metal, such as a tin alloy substantially free of lead, wherein the strip is hot dip coated to form an intermetallic layer and the invention be described with reference to the use; however, the invention has broader applications and can be used by applying an ultra thin layer of other metal, particularly tin, chromium and copper, essentially when the coating metal is not tin but a two-phase alloy such as a tin-zinc alloy.

Over the years, architectural materials, such as metal roofing systems and metal siding systems, made of pliable metals in various sheet gauge thicknesses have been used. Metals such as carbon steel, stainless steel, copper and aluminum are the most popular types of metal used for such architectural materials. The term "stainless steel" is used in the technical sense and includes the use of chromium, plated or alloyed, with a ferrous base. Carbon steel architectural metal materials were commonly treated with corrosion-resistant coatings to prevent rapid oxidation of the metal surface, thereby extending the life of the materials. A popular corrosion-resistant coating for carbon steel is a terne coating. Terne coating of stainless steel and copper is also produce, but is much less prevalent than carbon steel due to the natural corrosion-resistant properties of stainless steel and copper. Terne coating has been the predominate and the most popular coating for carbon steel materials due to its relatively low cost, ease of application, excellent corrosion-resistant properties and desirable colorization during weathering. Terne coated carbon steel is used for gasoline tanks, roofing and building materials and for various other products.

When the terne coated steel sheets are assembled into a roof covering, adjacent sheet edges usually are folded over one another to form the seam, typically a standing seam, and the seam is usually soldered vis-a-vis the terne coating to produce a waterproof joint. Today, the terne coated steel sheets can either be preformed or be formed at the job site onto roofing pans with bent edges which abut edges of adjacent pans which are then pressed or rolled into the seam. Similarly, caps, cleats, etc. are likewise formed from the terne coated sheet. In addition to providing for soldering of the seams, the terne coating inhibits rusting or oxidation of the metal sheet which would otherwise occur over time.

Terne or terne alloy is a term commonly used to describe an alloy containing about 80% lead and the remainder tin. The terne alloy is conventionally applied to the metals by a hot dip process wherein the metal strip is immersed into a molten bath of terne metal by a continuous or batch process. The terne coating inhibits the formation of ferrous oxide on the metal thus preventing corrosion and extending the life of the coated metal. The corrosion resistant properties of the terne alloy are primarily due to the stability of elemental lead and tin and the lead-tin oxide which forms from atmospheric exposure.

Although terne coated metals have excellent corrosion-resistant properties and have been used in various applications, terne coated materials have recently been questioned due to environmental concerns. Terne coated metals contain a very high percentage of lead. Although the lead in terne alloys is stabilized, there is concern about leaching of the lead from the terne alloy. Environmental and public safety laws have been recently proposed and/or passed prohibiting or penalizing the user of materials containing lead. Because the terne alloy contains a very high percentage of lead, materials coated with terne have been prohibited in various types of usages or applications such as aquifer roofing systems. The concern of lead possibly leaching from the terne coating has made such coated materials inadequate and/or undesirable for several types of building and manufacturing applications. When terne is used in the automotive field, such as gasoline tanks, the components are eventually scrapped and the terne coated parts are discarded into land fills. The discarding of such parts has raised recent environmental concerns especially with respect to underground water sources. Consequently, terne coated automotive parts are in the process of being replaced. The prevailing wisdom in the business has concluded that there is no viable coated steel substitute for terne coated parts. Consequently, gasoline tanks and various other parts are being designed as plastic with all of the associated economical and environmental problems associated with plastic materials.

Another disadvantage of terne coated materials is the softness of the terne layer. As noted, terne coated metal sheets are commonly formed into varying shapes. The machines that bend the metal sheets periodically damage the terne coating during bending process. The terne coating is susceptible to damage due to the abrasive nature of the forming machines.

The terne alloy has a further disadvantage in that the newly applied terne is very shiny and highly reflective. As a result, the highly reflective coating cannot be used on buildings or roofing systems such as at airports and military establishments. The terne coating eventually loses its highly reflective properties as the components within the terne coating are reduced (weathered); however, the desired amount of reduction takes approximately 1½ to 2 years when the terne coating is exposed to the atmosphere, thus requiring the terne metals to be stored over long periods of time prior to being used in these special areas. The storage time is significantly prolonged when the terne coated materials are stored in rolls and the rolls are protected from the atmosphere.

A tin coating electroplated on a carbon steel strip has been recently suggested for use for gasoline tanks and related automotive components; however, such a coating is expensive to manufacture and is not necessarily successful for a coated strip drawn into such uses.

Tin coating of carbon steel is a well-known process for use in the food industry. However, in the specialized art of architectural materials, a tin coating for architectural materials has not been used until just recently as disclosed in U.S. Pat. No. 5,314,758.

The most popular process for applying a tin coating to carbon steel for use in the food industry is an electrolysis process. In an electrolysis process, the coating thickness is very thin and typically ranges between $3.8 \times 10^{-4}$ to $20.7 \times 10^{-4}$ mm ($1.5 \times 10^{-5}$ to $8.15 \times 10^{-5}$ in.). Furthermore, the equipment and materials needed to properly electroplate the metal materials are very expensive and relatively complex to use. The expense of applying an electroplated tin coating and the limited obtainable thicknesses of the tin coating are a disadvantage for using such a process for building and roofing materials and in the automotive field. Such processes create an extremely thin layer with a network of small pinholes making the strip generally unacceptable. Such electroplated strip may have a base flash layer and/or a cover coating to overcome the pinhole problems inherent with an electroplating process.

After over a decade of attempting to develop a substitute for terne coated steel for gasoline tanks and related disposable components, the present solution has been to electroplate metals such as tin or tin and zinc. Such processes create an extremely thin layer with a network of small pinholes making the strip generally unacceptable. Before the research and development project of Applicants, the steel industry had no commercially acceptable process for producing a thin ferrous strip having a corrosion-resistant coating constituting an alloy which was essentially free of lead.

At this time, in 1995, the tin industry is still proposing and experimenting with electroplating of tin with protective layers because the process is believed to be the only way to continuously coat steel. Hot-dipping of tin has been generally ignored even though a hot-dip process for applying the tin coating may be used. It has been found that when the metal strip is not properly prepared, the coating is not properly applied to the roofing materials and minute areas of discontinuity in the tin coating occur resulting in non-uniform corrosion protection. This is especially a problem when the tin is applied to stainless steel materials by a hot-dip process. Tin is not electroprotective to steel under oxidizing conditions. Consequently, discontinuities in the tin coating result in the corrosion of the exposed metal. Although stainless steel corrodes at a significantly slower rate than standard carbon steel, the stainless steel will eventually corrode especially in high corrosive environments, i.e. petroleum, receptacles, marine products.

Prior to Assignee's application Ser. No. 000,101, the concept of coating stainless steel with a corrosive-resistant material had proven of limited success and coating stainless steel with tin by a hot-dip process had repeatedly been unsuccessful using conventional hot-dip processes as discussed above. Prior to Assignee's application Ser. No. 000,101, the only process which semi-successfully coated stainless steel with tin was the complex and expensive electroplating process. The thickness of the tin plate was limited to a very thin thickness of not more than $20.7 \times 10^{-4}$ mm ($8.15 \times 10^{-5}$ in.). The limited tin coating thickness resulting from electroplating limited the uses and life of the tin plated materials.

Tin coatings have the further disadvantage of having a highly-reflective surface. As a result, materials coated with a tin coating cannot be used in an environment where highly-reflective materials are undesirable until the coated materials are further treated (i.e. paint) or the tin is allowed time to oxidize.

Coating architectural materials and other metal strip with zinc metal, commonly known as galvanization, is another popular metal treatment to inhibit corrosion. Zinc is a highly desirable metal to coat architectural materials because of its relatively low cost, ease of application (i.e. hot-dip application) and excellent corrosion resistance. Zinc is also electroprotective to steel under oxidizing conditions and prevents the exposed metal, due to discontinuities in the zinc coating, from rapidly corroding. This electrolytic protection extends away from the zinc coating over exposed metal surfaces for a sufficient distance to protect the exposed metal at cut edges, scratches, and other coating discontinuities.

With all of the advantages of using zinc, zinc coatings have several disadvantages that make it undesirable for many types of building applications and for automotive components. Although zinc coatings will bond to many types of metals, the formed bond is not strong and results in the zinc coating flaking off the building materials. Flaking of zinc or zinc oxide in a gasoline tank will clog the gasoline lines and filters. Further, when using fuel injection systems, the small particles of zinc or zinc oxide will disable the injectors. Such problems are unacceptable in the automotive field. Thus, galvanized strip is common, but, not used for gasoline tanks. Zinc does not bond well on standard stainless steel materials. Zinc does not form a uniform and/or thick coating in a hot-dip process for stainless steel. As a result, discontinuities of the coating are usually found on the stainless steel surface. Zinc is also a very rigid and brittle metal and tends to crack and/or flake off when the materials are formed on site, i.e. press fitting of roofing materials or when gasoline tank components are drawn. When zinc begins to oxidize, the zinc coating forms a white powdery texture (zinc oxide). The popular grey, earth tone color is not obtained from pure zinc coatings.

Electroplating a tin and zinc mixture onto a steel sheet is disclosed in Japanese Patent application No. 56-144738 filed Sep. 16, 1981. The Japanese patent application discloses the plating of a steel sheet with a tin and zinc mixture to form a coating of less than 20 microns thick. The Japanese patent application discloses that after plating pin holes exist in the coating and subject the coating to corrosion. The pin holes are a result of the crystalline layer of a tin and zinc mixture which slowly forms during the plating process. The charged tin and zinc atoms in combination with the atomic structure of the atoms and formed crystal structure of a tin and zinc mixture prevents a uniform coating from being formed on the plated steel sheet. Consequently, the crystalline depositions must be covered with a chromate or phosphoric acid to fill the pin holes and prevent immediate corrosion.

The electroplating of the tin and zinc mixture onto the plated articles does not form an intermetallic layer between the article and the plated tin-mixture. Only when high temperature levels are obtained to melt the tin and zinc does an intermetallic layer form. As discussed in Assignee's application Ser. No. 165,085, the molten tin in a tin coating alloy interweaves with the surface atoms of the coated article. This intermetallic layer forms a strong bond between the metal strip and the molten alloy. The intermetallic layer also has excellent corrosion-resistant properties. Because the Japanese Patent application No. 56-144738 does not produce an intermetallic layer during electroplating, the Japanese patent application discloses that a preplated layer of nickel, tin or cobalt on the steel sheet surface is needed so that the plated tin and zinc mixture will adhere to the steel sheet. Such electroplating techniques, as disclosed in the Japanese patent application, cost a tremendous amount of time and money and do not produce a commercially successful product. The Japanese patent application creates a network of pinhole, as does any electroplating process; therefore, the strip, when drawn, creates large areas exposing the base metal. Thus, in the manufacture of gasoline tanks, steel would be exposed directly to the stored liquid fuel and rapidly corrode.

The coating of steel articles by a batch hot-dip process with a tin, zinc and aluminum mixture is disclosed in U.S. Pat. No. 3,962,501 issued Jun. 8, 1976. The '501 patent discloses that the tin, zinc and aluminum mixture resists oxidation and maintains a metallic luster. The '501 patent discloses that the coating is applied by immersing a steel article into the molten alloy bath and subsequently withdrawing the steel article. The '501 patent also discloses that a molten tin-zinc alloy bath containing 3–97% zinc is very susceptible to oxidation at the surface thus producing viscous oxides which causes severe problems with the process of immersing the steel articles into the molten alloy and subsequently removing the steel article from the molten alloy. Further, while the steel article is in the molten alloy, a large amount of dross is produced which results in non-uniformity of the coating and the formation of pin holes. The '501 patent discloses that the addition of up to 25% aluminum to the tin and zinc mixture inhibits dross formation during immersion of the steel article, prevents Zn—Fe alloy formation and reduces the viscous oxide formation on the molten bath surface. The '501 patent does not suggest the coating of continuous metal strip, nor does it teach the use of a continuous, hot dip coating process which resolves the viscous oxide problem and dross formation problem. The continuous hot-dip process of a strip material subjects all the surfaces of the strip to a uniform residence time in the molten alloy to produce a relatively uniform coating and coating thickness on the continuously moving strip. A batch process as disclosed in the '501 patent subjects the surface of the article to differing residence times in the molten alloy during immersion and removal of the article into the molten alloy. The only way to overcome the disadvantage of such a process is to hold the article in the molten metal for a prolong time as suggested by the '501 patent. This differing of residence time in the molten alloy produces differing coating thicknesses and coating properties on the coated article or dictates a long holding time in the metal. The '501 patent also discloses the formation of a highly reflective coating which cannot be used in many building applications.

The treatment of a steel sheet by plating tin and zinc is disclosed in U.S. Pat. No. 4,999,258. The '258 patent discloses a steel sheet plated with a layer of tin and subsequently applying a layer of zinc such that the ratio of the zinc to tin is 2–30%. The tin and zinc plated layers are then heated until the zinc alloys with the tin. The tin and zinc plated coatings are plated to form a very thin layer. The tin is applied at 0.2–1.0 g/m$^2$ and the zinc is applied at 0.01–0.3 g/m$^2$. Due to the very thin coating thickness, the flow heating of the tin and zinc plating layers only requires 2–5 seconds for proper tin-zinc alloying. The '258 patent also discloses that when less than 1% zinc is used, the beneficial effect of the zinc is null; however, when more than 30% zinc is used, the coating will rapidly corrode under adverse environments. The '258 patent also discloses that a nickel plated layer is preferably applied to the steel sheet prior to applying the tin and zinc plated layers to improve corrosion resistance. The heat treated tin-zinc layer can be further treated by passivating with a chromate treatment to further improve corrosion resistance. The '258 patent does not teach the coating of metal strip, nor does it teach the use of a hot dip coating process, nor does it teach the use of a continuous hot dip coating process which resolves various process problems such as viscous oxide and dross formation. The '258 patent is limited to the producing of a very thin tin-zinc coating. Such a thin coating is highly susceptible to tearing when the coated metal material is formed into products such as automotive products and roofing products.

A continuous process for electroplating a carbon steel strip is disclosed in U.S. Pat. No. 5,203,985. The '985 patent discloses that nickel is electroplated on a continuously moving strip of carbon steel. After the carbon steel has been nickel plated, the plated strip is hot dip coated with molten zinc. The '985 patent is absent any teachings concerning a two phase tin and zinc alloy and the advantages of using such a two phase coating. Prior to the present invention, a tin and zinc coating was applied to a metal surface primarily by an electroplating process. As discussed above, such plated tin and zinc coatings were commercially unacceptable.

Due to the various environmental concerns and problems associated with corrosion-resistant coatings applied to metal architectural materials and automotive products, there has been a demand for a coating which is easily and successfully applied to materials that protect the materials from corrosion, does not have a highly-reflective surface subsequent to application and is applied by an economical process.

SUMMARY OF THE INVENTION

The present invention relates to a product and method of producing a corrosion-resistant, environmentally friendly metal material. More specifically, the invention relates to the coating of metal strip with a coating having a low lead content, indeed being essentially lead free, and forms a corrosive-resistant barrier on the coated strip.

In accordance with the principal feature of the invention, there is provided a metal strip of stainless steel, carbon steel or copper coated with a corrosion-resistant metal alloy. Preferably, the metal coating alloy is an alloy primarily including tin for a single phase alloy system or primarily including tin and zinc for a two-phase alloy system. Other metal strip compositions which have been coated include metal strip made of nickel alloys, aluminum, titanium and bronze. "Stainless steel" in the application is used in its technical sense and includes a large variety of alloy metals containing chromium and iron. Chromium plated ferrous materials are also stainless steel. During hot-dipping, the plated chromium softens and intermingles with the ferrous strip to form a ferrous-chromium alloy. The stainless steel may also contain other elements such as nickel, carbon, molybdenum, silicon, manganese, titanium, boron, copper, aluminum and various other metals or compounds. Elements such as nickel can be flashed (electroplated) onto the surface of the chromium-iron alloy or directly incorporated into the chromium-iron alloy, i.e. the stainless steel.

In accordance with another aspect of the present invention, the metal strip is plated, metal spayed or hot dipped with an intermediate metal barrier prior to applying the metal alloy coating to the strip surface. The intermediate metal barrier provides additional corrosion resistance, especially against halogens such as chlorine. The metal barrier preferably is tin, nickel, copper or chromium. Other metals such as aluminum, cobalt, molybedum, Sn—Ni or Fe—Ni are also used. The metal barrier is applied to the metal strip to form a very thin metal layer. Although the metal alloy coating provides excellent protection against most corrosion-producing elements and compounds, and forms a strong bond with the metal strip, the inclusion of the intermediate metal barrier enhances the bonding and/or corrosion resistant characteristics of the metal coating alloy. The nickel is preferably flashed or plated to the metal strip surface. Nickel plating of the metal strip has been found to improve corrosion-resistance especially against compounds such as chlorine which have the ability to penetrate the metal alloy coating and attack and oxidize the surface of the metal strip thereby weakening the bond between the metal strip and the metal alloy coating. The nickel barrier has been found to provide an essentially impenetrable barrier to these elements and/or compounds which in fact penetrate the metal alloy coating. Due to the very small amount of these compounds penetrating the metal alloy coating, the thickness of the nickel barrier is preferably maintained at an ultra-thin thicknesses while still maintaining the ability to prevent these components from attacking the metal strip. The metal alloy coating and thin nickel coating effectively complement one another to provide superior corrosion resistance. Tin, chromium or copper form an intermediate metal barrier layer which improves the bonding of the metal alloy coating to the metal strip. These metals have also been found to improve the corrosion-resistance of the formed intermetallic layer and inhibit the zinc intermetallic layer growth which causes problems with dross formation and impair mechanical properties, i.e. cracking due to forming. The copper is plated onto the surface of the metal strip. The plated copper layer is formed by passing the metal strip through a standard electroplating process for by adding copper sulfate to a pickling solution and pickling the copper strip. Chromium is plated to the metal strip by a conventional plating process. Tin is coated onto the metal strip by hot dipping, plating or metal spraying.

In accordance with still another aspect of the present invention, the intermediate metal barrier layer is heated prior to the plated strip being hot dipped. The heating of the plated metal causes an intermetallic layer to begin to form and complete its formation once the strip has been hot dip coated. Such a pre-heating process results in the varying of the intermetallic layer composition which results in improved bonding and/or corrosion-resistance.

In accordance with the broad aspect of the invention, the metal strip passes into a molten bath of coating alloy. The molten alloy is an alloy primarily including tin for a single phase alloy system or primarily including tin and zinc for a two-phase alloy system. The alloy is essentially lead-free and is defined as a coating alloy containing no more than about 0.5 percent lead. Preferably less than 0.1 percent lead and more preferably less than 0.05 percent lead is included in the coating alloy. The temperature of the molten alloy is at least 449° F. The metal alloy must be maintained above its melting point or improper coating will occur. Tin melts at 232° C. (450° F.). Zinc melts at 419.6° C. (787° F.). Metals such as iron, nickel, aluminum, zinc, titanium, copper, magnesium, bismuth and antimony when added to the metal alloy raise the melting point of the metal alloy. For instance, the alloy is heated to temperatures as high as 538° C. (1000° F.) when copper is added to the alloy. Higher or lower temperatures are used to accommodate the addition of other metal additives or for the coating of other alloy compositions. In order to accommodate for high temperatures, the coating tank is made to withstand these higher temperatures such as increasing the thickness of the coating tank and/or using special high temperature melting materials for the construction of the coating tank. The coating of the molten metal alloy onto the metal strip forms an intermetallic layer between the surface of the metal strip and the layer of coating alloy. The intermetallic layer formed by metal atoms of the coating alloy molecularly intertwining with metal atoms on the surface of the metal strip as the molten coating alloy coats the metal strip. The heat from the molten alloy excites the surface atoms on the metal strip and facilitates in the intertwining of the atoms from the metal alloy coating into the metal strip. The formation of the intermetallic layer results in a strong bond between the metal alloy coating and the metal strip. This thin intermetallic layer is not created in a electroplating process since the plated alloy is not hot enough to create the intermetallic layer. The intermetallic layer is in-of-itself a corrosion-resistant layer. Applicants have discovered that the intermetallic layer is formed without the thin metal strip being preheated prior to coating. Prior art hot dipping process for terne commonly include the preheating of the metal strip to a temperature approaching the temperature of the molten terne. In the present invention, the metal strip need not be preheated to a temperature near the molten coating alloy. The thin metal strip need not be preheated to achieve formation of the intermetallic layer since the thin metal strip is quickly heated to the temperature of the molten alloy. Thicker metal strip is, i.e. >0.03 inch thick, preferably preheated prior to coating. The coating tank is maintained at a high enough temperature to heat the metal strip, coat the metal strip and form the intermetallic layer. The temperature of the coating tank is maintained several degrees above the molten coating alloy so as to prevent the molten alloy from solidifying when the metal strip enters the coating tank.

In accordance with another aspect of the present invention, the residence time of the metal strip in the coating tank is selected to properly coat the metal strip and form the intermetallic layer. Preferably, the metal strip is maintained in the coating tank for at least 5 seconds and less than 2–10 minutes and preferably less than one minute. Applicants have also discovered that an intermetallic layer which includes tin, chromium and iron forms a highly corrosion-resistant layer. Such an intermetallic layer composition is formed by hot dip coating stainless steel with a tin containing coating alloy, by hot-dip coating a ferrous strip with a coating containing tin and chromium and/or by coating a ferrous strip plated with chromium and hot-dip coating the plated strip with tin. The thickness of the intermetallic layer is very thin and preferably 1–10 microns ($3.0 \times 10^{-5}$–$3.9 \times 10^{-4}$ inch) thick.

In accordance with another aspect of the present invention, the alloy coating provides for a corrosion-resistant coating that protects the surface of the metal strip from oxidation and which is environmentally friendly thus immune from the prejudices associated with lead containing metal strip. The metal alloy coating is preferably an alloy which includes primarily tin for a single phase alloy system or includes primarily tin and zinc for a two-phase alloy system. The tin content of the single phase alloy system or the tin and zinc of the two-phase alloy system makes up at least 75 weight percent of the alloy and preferably makes up to at least 80 weight percent of the alloy and more preferably at least 90 weight percent of the alloy.

In accordance with another aspect of the invention, bismuth, antimony, nickel, zinc, aluminum, chromium, titanium, tin, copper, iron and/or magnesium are added to the metal alloy coating to enhance the physical properties of the metal alloy, improve corrosion resistance, improve grain refinement, inhibit oxidation, inhibit dross formation during coating, stabilize the metal alloy, and/or inhibit the crystallization of the tin in tin containing metal alloys. The metal alloy coating is preferably an alloy primarily including tin for a single phase coating alloy system or primarily including tin and zinc for a two-phase alloy system. The metal alloy preferably contains metal stabilizing additives. When tin crystallizes, the bonding of the tin containing alloy coating to the metal strip weakens and results in flaking of the coating. The addition of small amounts of stabilizing metals, such as bismuth, antimony, copper and mixtures thereof in an amount of at least 0.005 weight percent prevents and/or inhibits the crystallization of the tin. For two-phase tin and zinc alloy coatings, the amount of metallic stabilizer required to inhibit the crystallization of the tin in the two-phase alloy may be as low as 0.005. For a single phase tin alloy coating, the amount of metallic stabilizer in the alloy should be at least 0.01 weight percent. Bismuth and/or antimony also enhances the hardness, strength, mechanical properties and corrosion resistance of the metal alloy coating. Nickel, as a small additive, has been found to provide additional corrosion protection to the two-phase tin and zinc alloy coating especially in alcohol containing environments, such as for gasoline tanks. Copper can be added to single phase tin alloy coating systems and two-phase tin and zinc alloy coating systems, in addition to its stabilizing properties, as a coloring agent to reduce the reflective properties of the newly applied metal alloy and/or to obtain the desired coloring of the weathered metal alloy coating. Copper also improves the corrosion-resistance of the metal alloy coating especially in marine environments. Magnesium, when added in small amounts, has been found to improve the flow or coating properties of a two-phase tin and zinc alloy system so that more uniform coating is applied to the metal material. Magnesium also reduces the anodic characteristics of the coating to further increase the corrosion-resistance of the metal alloy coating. The magnesium also reduces oxidation of the molten metal alloy and/or reduce dross formation during the coating of the metal alloy. Aluminum is added to a single phase tin alloy system and to a two-phase tin and zinc alloy system in amounts of less than about 5 percent by weight of the coating alloy to inhibit oxidation of the molten metal alloy and to reduce dross formation on the metal alloy coating. Aluminum also reduces the thickness of the intermetallic Fe—Zn layer resulting from zinc containing metal alloys so as to improve the formability of the coated metal material. Titanium is added to a two-phase tin and zinc alloy system, in small amounts, to improve the grain refinement of the coated metal alloy and to increase the hardness and the strength of the metal alloy. Titanium also prevents oxidation of the molten metal alloy and helps reduce dross formation.

In accordance with yet another feature of the present invention, a metal coloring agent is added to the metal alloy to alter the reflective properties of the newly applied metal alloy. Newly applied single phase tin alloy and two phase tin and zinc alloy has a shiny silver surface which is reflective. Some of the two-phase tin and zinc alloy compositions are less reflective than a single phase tin alloy. In some building applications, this highly reflective property is unwanted. By adding a coloring agent such as metallic copper to the metal alloy, the newly coated strip exhibits a duller, less reflective surface. Metallic cooper adds a reddish tint to the metal alloy which significantly reduces the light reflective properties of the coating. Copper also assists in the corrosive resistive properties of the metal alloy. Copper is also added for its stabilizing properties for tin.

In accordance with an additional feature of the present invention, zinc metal is added to further increase the hardness of the tin based alloy while also contributing to the corrosion resistance of the metal alloy.

In accordance with another aspect of the present invention, the thickness of the metal strip is not more than about 0.2 inch and is preferably less than 0.05 inch and more preferably less than 0.03 inch and preferably greater than 0.005 inch. The strip thickness must not be too great so as to prevent the strip from being directed, at a high speed, through the pretreatment process, if any, and the coating process. Metal strip, such as stainless steel, carbon steel or titanium, which have a thickness greater than 0.2 inch is very difficult to maneuver at economical, high speeds through the coating process. A "strip" is defined as metal that is shipped to the coating process in coils, as opposed to plates. In addition, obtaining heat or temperature equilibrium of the strip during hot-dipping to properly form an intermetallic layer between the strip surface and coating alloy is very difficult with a thick strip at high speeds. Strip thicknesses which are less than 0.005 inch may break as the strip passes at high speeds and/or are under tension when being passed through the molten coating alloy. The thickness of the strip is also selected so that the formed or drawn coated strip is strong and durable enough for its intended end purpose. When stainless steel strip is used, 304 or 316 stainless strip having a thickness of 0.005–0.03 inch is preferable.

In accordance with another aspect of the present invention, the metal strip is pre-treated prior to applying the metal alloy coating. The pretreatment process includes several steps for metals such as stainless steel or includes only a few steps for metals which are easier to clean and/or have a preactivated surface when received in coil form. Commercial stainless steel usually has a passivated surface which is difficult to consistently and uniformly coat in a high speed hot-dipped process. "High speed" means a residence time in a molten bath of less than 1.0 minute and less than 30 seconds. The pretreatment process is preferably similar to the process disclosed in Assignees' U.S. patent application Ser. No. 000,101 and incorporated herein. The pretreatment process typically includes pickling and chemical activation of the metal strip surface.

The pickling process is formulated to remove a very thin surface layer from the metal strip surface. The removal of a very thin layer from the surface of the metal strip results in the removal of oxides and other foreign matter from the metal strip surface thereby activating the surface prior to applying the metal alloy coating. When coating stainless steel, it is especially important to activate the stainless steel surface in order to form a strong bonding and uniformly coated metal alloy coating. Stainless steel contains chromium and iron. The chromium in the stainless steel surface reacts with atmospheric oxygen to form chromium oxide. The chromium oxide film creates an almost impenetrable barrier to protect the iron within the stainless steel from the oxygen in the atmosphere, thus inhibiting the oxygen to combine with the iron to form iron oxides. The chromium oxide film also forms a very tight and strong bond with the stainless steel and is not easily removed. Although the formation of the chromium oxide film is important in the corrosion-resistant properties of the stainless steel and is intended for commercial stainless steel, the chromium oxide film of commercial stainless steel interferes with the bonding of a thin layer of hot-dipped metal alloy coating to the stainless steel surface resulting in weak metal alloy coating bonding and in flaking. The surface activation of a stainless steel strip, as with other metal strip, is accomplished by removing the oxides on the surface of the metal strip. The removal of a chromium oxide film from the stainless steel surface activates the stainless steel strip surface. Testing of stainless steel strip has revealed that the removal of chromium oxide film improves the bonding of the metal alloy coating and allows for thick and/or uniform metal alloy coatings to be formed. Oxide removal on other metal strip also improves the bonding and coating thickness of the metal alloy coating. The pickling process removes the detrimental oxide layer to facilitate in the formation of a strong bonding and uniform metal alloy coating.

The pickling process slightly etches the metal strip surface to remove a very thin layer of the surface. The rate of etching is usually not the same throughout the surface of the metal strip thereby forming microscopic valleys on the metal strip surface which increases the surface area for which the metal alloy coating bonds to the metal strip.

The pickling process includes the use of a pickling solution which removes and/or loosens the oxide from the metal strip surface. The pickling solution contains various acids or combinations of acids such as hydrofluoric acid, sulfuric acid, nitric acid, hydrochloric acid, phosphoric acid and/or isobromic acid. Hydrochloric acid solutions are preferably used to pickle carbon steel. A specially formulated pickling solution should be used when the metal strip is stainless steel since the activation of a stainless steel surface is not properly accomplished by use of prior art pickling solutions containing only sulfuric acid, nitric acid or hydrochloric acid. The specially formulated pickling solution contains a special combination of hydrochloric acid and nitric acid. This special dual acid formulation was found to be surprisingly effective in the rapid removal of chromium oxide from stainless steel substrates. The use of this dual acid solution is classified as aggressive pickling of the metal strip. The dual acid composition of the pickling solution preferably includes 5–25% hydrochloric acid and 1–15% nitric acid and preferably about 10% hydrochloric acid and 3% nitric acid. The dual acid results in limited etching of the stainless steel to increase the surface area without causing detrimental pitting of the stainless steel surface. The control of the temperature of the pickling solution is important so as to provide a desired activity of the acid to remove the oxides from the metal surface. The temperature of the pickling solution is maintained above 80° F. and usually between 120°–140° F. and preferably 128°–133° F. Higher acid concentration and/or higher temperatures will increase the activity and aggressiveness of the pickling solution in the removal of oxides. The temperature of the pickling solution is preferably maintained by recirculation through heat exchangers.

The pickling solution is preferably agitated to prevent the solution from stagnating, varying in concentration, varying in temperature, and/or to remove gas pockets which form on the metal strip surface. Agitation of the pickling solution is carried out by placing agitators in the pickling tank and/or recirculating the pickling solution. Agitation brushes preferably are placed within the pickling tank to agitate the acid solution and scrub the metal surface immersed in the acid solution. The metal strip is preferably scrubbed during the aggressive pickling process to facilitate in the activation of the metal strip surface. Scrubbing the metal surface increases and accelerates the removal of oxides from the metal surface.

Only one pickling tank is needed to properly activate the metal strip surface; however, additional pickling tanks can be used. The pickling tanks are about twenty-five feet in length; however, the size of the tank may be longer or shorter. The total time for pickling the metal strip is preferably less than 10 minutes, more preferably less than a minute and even more preferably about 10 to 20 seconds to properly activate the metal strip. The metal strip is preferably processed in a continuous process, the pickling tanks are usually 25 feet in length and the sheet strip is run through the pickling tanks at a rate of 1–400 ft/min, preferably between 50 to 250 ft/min thereby subjecting the metal strip to the pickling solution in each pickling tank for preferably less than one minute. The sheet strip is preferably unrolled from a roll of metal strip and guided through the continuous process, i.e. unroll the metal strip, process and coat the strip, and roll up the coated strip.

Once the metal strip has been pickled, the metal strip is preferably treated in a chemical activation process. The chemical activation process further removes oxides and foreign material from the metal strip by subjecting the metal strip surface to a deoxidizing agent. After the pickling process, very little oxide, if any, is present on the metal surface. The virgin surface is highly susceptible to forming oxides between the time period the metal strip is removed from the pickling tank and being coated by a hot-dip process. When the metal strip is sufficiently activated by only the pickling process, the chemical activation step is eliminated. Due to the difficulty in removing oxides from stainless steel strip, a stainless steel strip is preferably treated in the chemical activation process after the stainless steel strip has been treated in the pickling process. Various types of deoxidizing solutions have been tested. Zinc chloride has been found to be an excellent deoxidizing solution. The zinc chloride acts as both a deoxidizer and a protective coating from oxide formation for the metal strip surface. The temperature of the zinc chloride solution is kept at about ambient temperature (60°–90° F.) and is preferably agitated to maintain a uniform solution concentration and temperature. Small amounts of hydrochloric acid are preferably added to the deoxidizing solution to further enhance oxide removal. Preferably, hydrochloric acid is added to the zinc chloride when treating a stainless steel strip. The time the metal strip is subjected to the deoxidizing solution is usually less than 10 minutes. The metal strip is preferably processed in a continuous process. The deoxidization solution tanks are preferably 25 feet in length and the metal strip is subjected to the deoxidation solution for preferably less than one minute.

In accordance with another aspect of the invention, the metal strip is treated with an abrasive and/or absorbent material and/or subjected to a solvent or other type of cleaning solution to remove foreign materials and oxides from the metal strip surface prior to pickling and/or chemical activation of the strip. Metal strip that is unrolled from a roll of metal strip commonly has foreign debris on the surface of the metal strip. Such debris may consist of dirt, oil, glue, etc. Many of these foreign substances do not react with or are not readily removable by the pickling solution, thus adversely affecting the removal of oxides from the metal strip. Treating the metal strip with an abrasive and/or absorbent material removes these foreign substances from the metal strip. The brushes are stationary or moving relative to the metal strip. The brushes roughen the surface of the metal strip to further enhance the activation of the metal strip during the pickling process. The roughed up surface of the metal strip allows the pickling solution to more readily attack the surface of the metal strip.

In accordance with another aspect of the present invention, the pretreatment process preferably includes the maintaining of a low oxygen environment prior to and/or subsequent to subjecting the metal strip to the pickling process and/or chemical activation process and/or abrasion process. The maintenance of a low oxygen environment inhibits the formation and/or reformation of oxides on the metal strip surface. The low oxygen environment may take on several forms. Two examples of low oxygen environments are the formation of a low oxygen-containing gas environment about the metal strip or the immersion of the metal strip in a low oxygen-containing liquid environment. Both these environments act as shields against atmospheric oxygen and prevent and/or inhibit oxides from forming. When the metal strip is stainless steel, the low oxygen environment is preferably maintained throughout the pretreatment process of the stainless steel strip (i.e. abrasive/absorbent treatment, pickling treatment, pickling rinse treatment, chemical activation treatment, etc.) to just prior to the coating of the stainless steel strip with the metal alloy coating. Metals other than stainless steel can be totally, partially, or not subjected to a low oxygen environment during the pretreatment process. The non-oxidized surface of a metal strip is highly susceptible to re-oxidation when in contact with oxygen. By creating a low oxygen environment about the metal strip, new oxide formation is inhibited and/or prevented.

Examples of low oxygen gas environments include nitrogen, hydrocarbons, hydrogen, noble gasses and/or other non-oxidizing gasses. Preferably, nitrogen gas is used to form the low oxygen gas environment. Examples of low oxygen liquid environment include non-oxidizing liquids and/or liquids containing a low dissolved oxygen content. An example of the latter is heated water sprayed on the surfaces of the metal strip; however, the metal strip is alternatively immersed in heated water. Heated water contains very low levels of dissolved oxygen and acts as a shield against oxygen from forming oxides with the metal strip. The spray action of the heated water removes any remaining pickling solution or deoxidizing solution from the metal strip. The temperature of the heated water is maintained above about 100° F. and preferably at least about 110° F. or greater so as to exclude the unwanted dissolved oxygen.

In accordance with still yet another aspect of the present invention, the metal strip is rinsed with liquid after exiting the pickling solution to remove the pickling solution from the metal strip. After the metal strip exits the pickling solution, any pickling solution remaining on the metal strip continues to eat into the surface of metal strip thereby resulting in pitting of the metal strip. The pickling solution is preferably removed from the metal strip by passing the metal strip through a body of water. The water is above 80° F. and preferably be at least about 110° F. so as to exclude the dissolved oxygen from the water to prevent oxidation of the post-pickled metal strip. The rinse solution is preferably maintained at its desired temperature by recirculating the rinse solution through heat exchangers. Although the rinse process primarily removes the pickling solution from the metal strip, the rinse process also removes loosened oxides from the metal strip surface. The rinse solution removes small amounts of oxides due to the slightly acidic nature of the rinse solution. As the rinse solution removes the pickling solution from the metal strip, the pickling solution enters the rinse solution and acidifies the rinse solution. The slightly acidic rinse solution attacks small amounts of oxides on the metal strip to further clean the metal strip surface. The rinse solution is preferably agitated to both facilitate the removal of the pickling solution from the metal strip and to dilute the removed pickling solution within the rinse solution. The agitators preferably include moving brushes which preferably contact the metal strip. The rinse solution is preferably recirculated and diluted to prevent the occurrence of high acidity levels.

In accordance with yet another aspect of the present invention, the metal alloy coating is applied to the metal strip by a hot-dip process. Some aspects of the hot-dip process may be used in various processes. Preferably, the coating of the metal strip is by a continuous hot dip process similar to the one disclosed in Assignee's U.S. patent application Ser. No. 000,101. The metal strip is coated in the hot-dip process by passing the metal strip at high speed through a coating tank which contains the molten alloy. The coating tank preferably includes a flux box whereby the metal strip passes through the flux box and into the molten alloy. The flux box preferably contains a flux which has a lower specific gravity than the molten metal alloy, thus the flux floats on the surface of the molten alloy. The flux within the flux box acts as the final surface treatment of the metal strip. The flux removes residual oxides from the metal strip surface, shields the metal strip surfaces from oxygen until the metal strip is coated with the molten metal alloy, inhibits the formation of viscous oxides at the point where the metal strip enters the molten metal alloy and inhibits dross formation on the metal strip. The flux preferably contains zinc chloride. The flux also preferably contains ammonium chloride. The flux solution contains approximately 30–60 weight percent zinc chloride and up to about 40 weight percent ammonium chloride and preferably 50% zinc chloride and 8% ammonium chloride; however, the concentrations of the two flux agents is varied accordingly.

In accordance with yet another aspect of the present invention, the coating tank is heated by heating coils, heating rods, gas jets, etc. Preferably, the coating tank is heated by at least one gas jet directed to at least one side of the coating tank. Heating coils and heating rods are preferably used to heat the metal directly in the coating tank which contains the tin alloy. Gas jets are used as an alternative to heating rods to heat the molten metal alloy, especially if the alloy includes large amounts of zinc. Such zinc containing alloys have been found to rapidly eat through the heating elements immersed in the alloy.

In accordance with another aspect of the present invention, a protective material is placed over the surface of the molten metal alloy in the coating tank. The protective material has a specific gravity which is less than the molten metal alloy so that the protective material floats on the surface of the molten metal alloy. The protective material shields the molten metal alloy from the atmosphere thereby preventing oxides from forming on the molten metal alloy surface. The protective material also inhibits dross formation on the coated metal strip as the coated metal strip exits from the coating tank. When the protective material is palm oil, the melting point of the metal alloy must be below the 650° F. degrading point for the palm oil. For coating alloys having higher melting point temperatures, special oils, fluxes, or other materials and/or special cooling procedures for the protective material are employed.

In accordance with another aspect of the present invention, the continuously moving coated metal strip exiting the coating tank is subjected to an air-knife process. In an air-knife process, the coated metal strip is subjected to a high velocity gas. The high velocity gas strips surplus molten metal alloy coating from the metal strip, smears the molten metal alloy coating over the metal strip, improves the grain size of the metal alloy coating, reduces lumps or ribs of molten metal alloy coating forming on the surface of the metal strip and reduces the coating thickness of the molten metal alloy coating. The high velocity gas is air or an inert gas which does not oxidize with the molten metal alloy. Preferably, the gas is an inert gas such as nitrogen, sulfur hexafluoride, carbon dioxide, hydrogen, noble gases and/or hydrocarbons. When an inert gas is used, the protective material on the surface of the molten metal alloy in the coating tank (i.e. palm oil) is preferably eliminated since the inert gas prevents dross formation, viscous oxide formation in the region in which the inert gas contacts the molten metal alloy in the coating tank. The high velocity inert gas also breaks up and pushes away any dross or viscous oxides from the surface of the molten metal alloy in the coating tank in the region the inert gas contacts the molten metal alloy thereby forming an essentially dross free—viscous oxide free region for the coated metal strip to be removed from the coating tank. The high velocity gas is preferably directed onto both sides of the coated metal strip and at a direction which is downward toward the coating tank and at a direction which contacts the coated metal strip at an angle which is not perpendicular to the surface of the coated metal strip. This direction of the gas directs the removed molten metal coating alloy back into the coating tank. An applicable design of the air knife process is disclosed in U.S. Pat. No. 4,862,825 which is incorporated herein.

In accordance with still another aspect of the present invention, the thickness the molten metal alloy coating is controlled by one or more sets of coating rollers. The coating rollers form a smooth and uniform metal alloy coating layer on the metal strip. When palm oil is used as a protective material on the surface of the coating tank, the coating rollers are preferably partially or totally immersed in the palm oil. The palm oil facilitates in quality distribution of the metal alloy coating layer onto the metal strip. The thickness of the metal alloy coating is at least 0.0001 inch and is preferably 0.0003–0.05 inch and more preferably, 0.001–0.002 inch. The thickness of the metal alloy coating is also regulated by the residence time of the metal strip in the coating tank, the temperature of the metal alloy in the coating tank and the use of an air-knife process. The thickness of the alloy coating coated on the metal strip will also be dependent on the speed at which the metal strip travels through the alloy. A strip speed above 400 ft/min results in high shear forces which interferes with proper coating resulting in improper or defective alloy coating of the metal strip. When an air-knife process is employed, the coating rollers are preferably used in conjunction with the air-knife process or alternatively, the coating rollers are completely eliminated.

In accordance with yet another aspect of the present invention, spray jets are preferably used to spray molten metal alloy onto the metal strip to ensure a uniform and continuous coating on the metal strip. The metal spray jets are preferably positioned adjacent to the coating rollers to ensure complete coating of the metal strip. The metal spray jets spray molten metal alloy onto the coating rollers and/or onto the metal strip. As the coating rollers rotate to allow the metal strip to pass between the coating rollers, the molten metal alloy sprayed on the rollers is pressed against the metal strip and fills in any pin holes or uncoated surfaces on the metal strip. The use of spray jets eliminates the need for two separate coating steps, especially when the invention is used for tin coating. When coating rollers are not used, spray jets are preferably used to spray the molten metal alloy directly onto the metal strip.

After the metal strip has been coated, the coated metal strip is preferably cooled. The cooling of the coated metal strip is accomplished by spraying the coated metal strip with a cooling fluid such as ambient temperature water and/or immersing the coated metal strip in a cooling liquid such as ambient temperature water. The cooling of the coated metal strip usually is less than one hour and preferably is less than a few minutes. When the alloy coating cools at different rates, different grain size and grain densities are formed. Slowly cooling the alloy coating results in larger grain size, lower grain densities, and a highly reflective surface. Rapid cooling of the alloy coating produces fine grain size, increased grain density and a less reflective surface. Small grain sizes and higher grain densities produce a stronger bond with the metal strip and greater corrosion resistance. For a liquid injection or spray process, water is jet sprayed onto the coated metal strip. In such a cooling process, the metal strip is preferably guided through the cool water jet sprays by a camel-back guide. The camel-back guide is designed such that only the edges of the coated metal strip contact the guide. By minimizing the contact of the coated metal strip with the guides, the amount of coating alloy inadvertently removed from the coated metal strip is reduced. The camel-back guide is also designed to allow the water jets to cool the underside of the coated metal strip. For an immersion process, the cooling water is normally agitated to increase the cooling rate of the coating metal strip. The temperature of the cooling water is preferably maintained at proper cooling temperatures by recycling the water through heat exchangers and/or replenishing the water. The cooling water is preferably not deoxygenated prior to cooling the coated metal strip coating. The oxygen in the cooling water oxidizes with the metal coating alloy during rapid cooling which results in a slightly discolored coated metal strip surface having reduced reflectability.

In accordance with another aspect of the present invention, the coated metal strip is passed through a leveler, whereby the coated metal alloy is uniformly molded about the metal strip. The leveler consists of a plurality of rollers. The coated metal strip is passed through the rollers to smooth out the metal alloy coating on the metal strip. The metal strip is preferably maintained at a tension as it is passed through the leveler.

In accordance with another aspect of the present invention, the coated strip is coiled into coils for later processing on high speed presses, such as used in the automotive field. Alternatively, the coated metal strip is sheared after it has been cooled or leveled. Since the metal strip is a continuously moving metal strip, the shearing device travels next to and at the same speed as the coated metal strip to properly shear the moving strip. When the metal strip is not cut, the metal strip is rolled into a roll of coated strip for ease of transport and/or for use in subsequent treatments and/or forming (i.e. roof materials). The continuous processing of the strip from roll to roll facilities in the ease, efficiency and cost effectiveness of coating a metal strip.

In accordance with still another aspect of the present invention, the metal strip is processed in an acid solution after coating the metal strip to expose the intermetallic layer which formed between the metal strip surface of the strip and the coating alloy during the hot dip coating process. The removal of the layer of metal alloy coating is described in Assignee's application Ser. No. 165,085 which is incorporated herein.

In accordance with another aspect of the present invention, the coated metal strip is treated with a weathering agent to accelerate the weathering and discoloration of the metal alloy coating. Metal alloy coatings containing high concentrations of tin are commonly highly reflective. To reduce the reflectivity of such metal alloy coatings, the weathering material is applied to the metal alloy coating to oxidize the metal alloy coating surface and reduce the reflectivity of the metal alloy coating. The weathering material is an asphalt-based paint which causes accelerated weathering of the metal alloy coating when it is exposed to the atmosphere. The asphalt-based paint significantly decreases the weathering time of the metal alloy coat to less than a year. The asphalt paint is preferably a petroleum-based paint which includes asphalt, titanium oxide, inert silicates, clay, carbon black or other free carbon and an anti-settling agent. The asphalt-based paint is preferably applied at a relatively thin thickness so as to form a semi-transparent or translucent layer over the metal alloy coating. The thickness of the asphalt-based paint ranges between 0.25 to 5 mils and preferably is 1–2 mils. Once the translucent paint has been applied to the coated metal strip, the weathering material is dried, preferably by air drying and/or heated by heating lamps.

In accordance with yet another feature of the present invention, the metal alloy coating composition is such that the coated metal strip is formed on site without the metal alloy coating cracking and/or flaking off. For zinc containing alloys, the amount of zinc is controlled and stabilizers are used to prevent the coating alloy from becoming too rigid and brittle and to also inhibit the formation of zinc oxide.

In accordance with an aspect of the present invention, the metal strip is provided in a large coil, passed through a pretreatment process, usually without preheating, and then moved continuously as a continuous moving strip through the bath containing a metal coating alloy.

In accordance with an aspect of the invention, a thin ferrous strip is uncoiled and passed longitudinally through a molten bath of a coating alloy comprising at least about 15% by weight tin at a speed so that an intermetallic layer is formed between the coating alloy and the surface of the ferrous strip. When the thin strip includes chromium, as well as iron, it is defined as a "stainless steel" strip. The thin strip is continuously passed through an electrolytic tank to coat an ultra thin layer of tin, chromium, nickel or copper on the moving strip prior to hot dip coating. This coating or "flashing" of tin chromium, nickel or copper does not interfere with the formation of intermetallic layer and improves the bonding and corrosion resistance of the coating alloy.

In accordance with another aspect of the present invention, when flashing on tin, the tin is heated to cause it to flow before or during the subsequent hot dip coating process.

In accordance with another feature of the present invention, the metal alloy exhibits excellent soldering characteristics such that various electrodes including lead and no-lead electrodes can be used to weld the coated metal.

The primary object of the present invention is the provision of a roofing material treated with a metal alloy having high corrosion resistant properties.

Another object of the present invention is the provision of a metal strip coated with a single phase metal alloy including a majority of tin.

Another object of the present invention is the provision of a metal strip coated with a two-phase metal alloy including a majority of tin and zinc.

Another object of the present invention is the provision of applying a thin metal intermediate barrier to the surface of the metal strip prior to applying the metal alloy coating.

Another object of the present invention is the provision of an metal strip treated with a metallic coating that is not highly reflective.

Yet another object of the present invention is the provision of a metal strip having a two-phase tin and zinc coating which weathers to a grey, earth-tone color.

Yet another object of the present invention is the provision of a metal strip having a metallic alloy coating which is essentially lead free.

Still yet another object of the present invention is to provide a metal alloy coating applied to a metal strip which strip is formed and sheared to form various building and roofing components, gasoline tanks, and other formed metal strip that are subsequently assembled on site or in a forming facility without the metal alloy coating flaking off, chipping, shearing, cracking and/or forming large exposed areas on the surfaces of the metal strip.

Still another object of the present invention is the provision of providing a metal alloy coated strip which strip are preformed into roof pans or gaseous tanks and subsequently seamed on site either by pressed seams, welded seams or soldered seams into waterproof joints.

Yet another object of the present invention is the provision of coating a metal strip by a continuous, hot-dipped process wherein the strip has a controlled residence time in a molten bath as the strip moves longitudinally through the bath.

Yet another object of the invention is the provision of a coated metal strip which is corrosion-resistant, economical to produce and capable of being formed into a variety of shapes while not containing objectionable amounts of lead.

Another object of the present invention is the addition of a coloring agent to the metal alloy to dull the color of the metal alloy.

Still yet another object of the present invention is the addition of copper to the metal alloy to color the alloy and/or improve the corrosion-resistance of the metal alloy.

Yet another object of the present invention is the addition of magnesium to a two-phase tin and zinc metal alloy to improve the flow characteristics and corrosion-resistance of the metal alloy.

Another object of the present invention is the addition of titanium to a two-phase tin and zinc metal alloy to positively affect grain refinement in the metal alloy.

Yet another object of the present invention is the addition of titanium to a two-phase tin and zinc metal alloy to reduce oxidation of the molten metal alloy.

Still yet another object of the present invention is the addition of aluminum to the metal alloy to reduce oxidation of the molten metal alloy.

Another object of the present invention is the provision of a method of applying a protective metal alloy coating to a continuously moving strip metal, which method is economically acceptable and has essentially no lead.

Yet another object of the present invention is a metal alloy, as defined above, containing antimony and/or bismuth to harden the metal alloy and to inhibit crystallization of the tin in the metal alloy.

Another object of the invention is the provision of a metal strip coated with a metal alloy containing zinc and/or iron to enhance the strength and hardness of the metal alloy.

A still further object is to provide a metal alloy coating which has superior corrosive characteristics permitting a thinner coating of the metal alloy to the metal strip than that which is required for conventional terne coatings with the high lead content.

Another object of the invention is to provide a metal alloy coating that are soldered with conventional tin-lead solders or no-lead solders.

Still another object of the present invention is the provision of unwinding of a roll of strip metal, subjecting the continuous moving strip to a process which forms a protective layer on the strip, and re-rolling said processed strip.

Another object of the present invention is the provision of pickling a metal strip prior to hot-dipping the metal strip with metal alloy coating to form a strong alloy bond.

Yet another object of the present invention is the provision of chemically activating the metal strip to enhance the bonding between the metal strip and the metal alloy.

Still yet another object of the present invention is the provision of reducing the oxygen interaction with the metal strip during the pre-treatment of the metal strip prior to hot-dip coating the metal strip.

Yet still another object of the present invention is the provision of cooling the hot-dipped metal alloy coating to form fine, high density grains which produce a stronger bonding, more corrosive-resistant, discolored coating.

Another object of the present invention is the provision of abrasively treating the metal strip surface prior to pickling and/or chemically activating the metal strip.

Still yet another object of the present invention is the provision of using spray jets which spray metal alloy coating onto the coating rollers and/or metal strip surface to eliminate non-coated surfaces on the metal strip.

Another object of the present invention is the provision of coating the hot-dipped coated metal strip with a weathering material to accelerate the dulling of the surface of the metal alloy coating.

Still a further object of the present invention is the provision of a coated metal strip which does not require intentional oxidation to produce a non-highly reflective surface.

Another object of the present invention is the indirect heating of the coating tank without use of heating coils or heating rods.

Still another object of the present invention is the use of an air-knife process to control the thickness and quality of the metal alloy coating on the metal strip.

Yet another aspect of the present invention is the formation of an intermetallic layer between the base metal of a strip and the metal alloy, which intermetallic layer is formed by hot dip coating the metal alloy onto the metal strip and which forms a strong bond between the metal strip and the metal alloy coating.

A further object of the present invention is where the moving strip is sufficiently thin and moving at a speed that the metal strip is not preheated prior to hot dip coating process.

Still a further object of the present invention is the provision of providing a protective, colored layer on the surface of a metal strip by first applying a thin layer of metal alloy, preferably hot-dipped tin alloy, removing the tin with an oxidizing solution by an auto-catalytically controlled action to expose the protective layer and finally to color and/or passivity such protective layer.

Yet another object of the present invention is the provision of applying molten alloy coating to the oxide-free surface of the metal strip to form an intermetallic layer on the surface of the metal strip, which layer is exposed and treated to provide a protective barrier.

Another object of the present invention is the provision of providing a metal strip with an intermetallic layer containing chromium-iron-tin and having a protective, colored surface and passivating the protective layer.

Yet another object of the present invention is a metal strip with a pre-colored surface which is consistent and quite similar to weathered terne coated strip without any lead.

Another object of the present invention is the provision of subjecting a hot-dipped coated metal strip to an oxidizing solution to remove the metal alloy coating from the metal strip and expose the corrosion-resistant intermetallic layer.

Still a further object of the present invention is the provision of producing a highly corrosion-resistant metal strip that is economical to make by a continuous hot-dip process.

These and other objects and advantages will become apparent to those skilled in the art upon reading of the detailed description of the invention set forth below.

BRIEF DESCRIPTION OF THE DRAWINGS

FIGS. 1a–1b are a cross-sectional view of the process of hot-dip metal alloy coating of metal strip as defined in the present invention.

FIG. 2 illustrates a cross-section view of an alternative process of cooling the hot-dip metal alloy coated metal strip of the present invention;

FIG. 8 is a cross-sectional view of a coated metal strip which illustrates the intermetallic layer; and FIG. 9 illustrates a cross-sectional view of an alternative embodiment wherein a metal strip is unrolled and coated by passing the metal strip into a molten tank of molten alloy and then subjecting the metal strip to coating rollers and to an air-knife process and then re-rolling the coated strip into a coil.

DESCRIPTION OF THE PREFERRED EMBODIMENT

Figure 3:
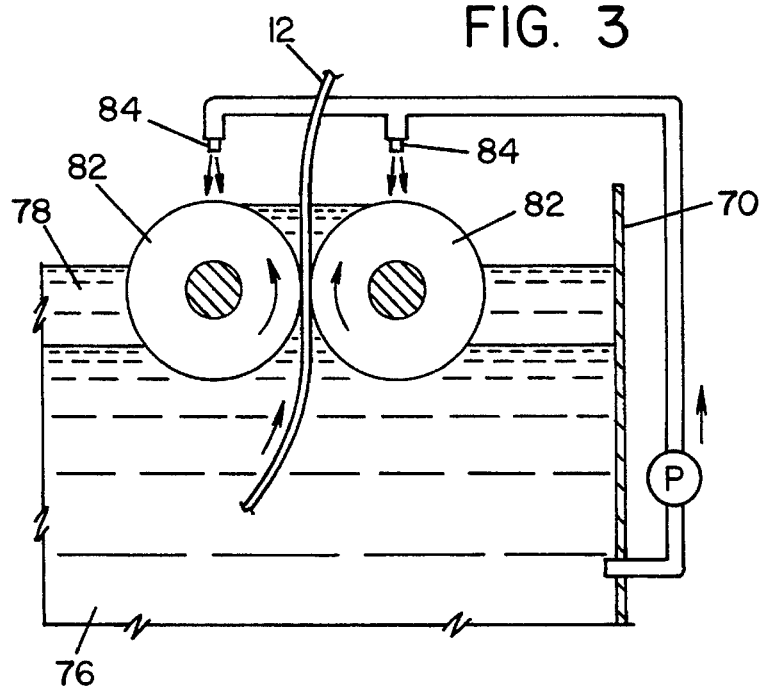
FIG. 3 illustrates a cross-sectional view of an alternative embodiment wherein metal spray jets are used during the hot-dip coating of the metal strip.

Referring now to the drawings, wherein the showings are for the purpose of illustrating preferred embodiments of the invention only and not for the purpose of limiting the same, reference is first had to FIGS. 1a–1b which illustrate the process for hot-dip coating a metal alloy on a metal strip.

The metal alloy is a corrosion resistive coating to prevent the coated metal strip from prematurely corroding when exposed to the atmosphere. The single phase metal alloy contains a large weight percentage of tin and a very low amount or no amount of lead. The two-phase metal alloy contains a large weight percentage of tin and zinc and a very low amount or no amount of lead. The metal alloy is highly corrosive resistant, abrasive resistant, pliable, weldable and environmentally friendly. The metal alloy binds with the metal strip to form a durable protective coating which is not easily removable.

The amount of corrosion resistance protection provided by the metal alloy coating is of primary importance. Metal strip such as carbon steel and stainless steel oxidize when exposed to the atmosphere. Over a period of time the oxidized steel, commonly termed corrosion, begins to weaken and disintegrate the steel. The coating of the metal strip with the metal alloy acts as a barrier to the atmosphere which prevents the base metal from corroding. Although the metal alloy oxidizes when exposed to the atmosphere, the rate of oxidation is significantly slower than oxidation rates of metal strip such as copper, carbon steel and stainless steel. By coating the metal strip with the metal alloy, the life of the metal strip is extended for many years.

The pliability of the metal alloy is also important when the coated metal strip is to be formed. For architectural materials, such as roofing systems, the roofing materials are formed into various shapes and are usually folded to form seams to bind the roofing materials together to form a roofing system. A roofing material coated with a metal alloy that forms a rigid or brittle coating on the roofing material usually cracks or prevents the roofing materials to be properly shaped. Furthermore, a roofing material coated with a metal alloy which is brittle or rigid hinders or even prevents the roofing material from being properly folded to form the necessary seams to attach the roofing materials together.

The metal alloy must be solderable since roofing panels are commonly soldered together. The metal alloy coating of the present invention meets all these requirements by containing a majority of tin for a single phase alloy and a majority of tin and zinc for a two-phase alloy and extremely low levels of lead for both types of alloys which produces a highly corrosive resistant metallic coating with relatively high pliability and are solderable to other materials.

The metal strip is preferably carbon steel, stainless steel or copper; however, the metal strip made of aluminum, bronze, nickel alloys, titanium and the like have also be successfully coated. When the metal strip is stainless steel, the strip is preferably 304 or 316 stainless steel. Metal strip is preferably used to apply a hot dip coating of a corrosion-resistant metal alloy.

As illustrated in FIGS. 1a–1b, strip 12 is a stainless steel strip provided from a large metal roll 10. The thickness of strip 12 is 0.005–0.2 inch. Preferably, strip 12 is less than 0.05 inch and about 0.015 inch. Strip 12 is unwound from roll 10 at speeds which are preferably less than 400 ft./min. and preferably between 70 to 250 ft./min. The strip speed is ultimately selected so that the residence time of the strip in coating tank 70 is less than 10 minutes and preferably less than one minute. Strip guides 13 are positioned throughout the hot-dip coating process to properly guide strip 12 through each treatment process.

Abrasion treater 14, in the form of wire brushes-16, is driven by motors. The wire brushes are placed in contact with strip 12 to remove foreign objects from strip 12 and to initially etch and/or mechanically remove oxides from the surface of strip 12. Abrasion treater 14 may take any form but is preferably biased against strip 12 to provide the necessary friction between the brushes 16 and strip 12 for proper cleaning of strip 12. Preferably, there is an abrasion treater 14 located on the top and bottom surface of strip 12 so that proper treatment of strip 12 is achieved. Abrasion brush 16 is preferably made of a material having a hardness greater than strip 12 so that abrasion brush 16 will not quickly wear down and will properly remove foreign materials and/or pre-etch strip 12. Abrasion brush 16 preferably rotates in an opposite direction relative to the moving strip 12 to provide additional abrasion to the strip 12. Strip 12 is preferably cleaned with cleaners or solvents such as alkaline cleaners or organic solvents to further remove debris. Abrasion treater 14 and/or the cleaning treatment is an optional process treatment and is preferably eliminated for certain types of metal strip such as titanium strip. Preferably, carbon steel and stainless steel are treated with abrasion treater 14.

Once strip 12 passes through abrasion treater 14, strip 12 enters a low oxygen gas environment 20. Low oxygen gas environment 20 is formed by surrounding the strip 12 with low oxygen-containing gas 22. Such gases include nitrogen, hydrocarbons, hydrogen, noble gases and/or other non-oxygen containing gases. Preferably, the low oxygen-containing gas 22 is nitrogen gas. The nitrogen gas surrounding the strip 12 acts as a barrier against oxygen in the atmosphere and prevents the oxygen from forming oxides on strip 12. The low oxygen environment is an optional process and is preferably used for stainless steel strip.

Strip 12, after leaving low oxygen gas environment 20, enters into pickling tank 30. Pickling tank 30 is about 25 feet in length and of sufficient depth to completely immerse strip 12 in pickling solution 32. The pickling tank can be longer or shorter depending on the speed of the metal strip. The pickling solution contains various acids or combinations of acids such as hydrofluoric acid, sulfuric acid, nitric acid, hydrochloric acid, phosphoric acid and/or isobromic acid. Pickling solution 32 preferably is a hydrochloric acid solution. The hydrochloric acid solution includes at least about 5% hydrochloric acid. The chromium oxide on the stainless steel strip surface are not easily removed and require an aggressive pickling solution to remove the surface oxides from the stainless steel strip to activate the surface of the strip. A dual acid solution of hydrochloric acid and nitric acid is used to aggressively pickle the stainless steel strip. The hydrochloric-nitric acid concentration within aggressive pickling solution 32 is about 5–25% hydrochloric acid and 1–10% nitric acid and more preferably, 10% hydrochloric acid and 3% nitric acid. Pickling solution 32 is maintained at a temperature of at least about 80° F. and preferably about 120°–140° F. so that pickling solution 32 is maintained in a relatively high reactive state to properly remove oxides from the surface of strip 12. Pickling solution 32 also provides minor etching of the surface of strip 12, which removes a very small surface layer of strip 12.

Pickling tank 30 contains at least one agitator 34. Agitator 34 is provided to agitate pickling solution 32 to maintain a uniform solution concentration, maintain a uniform solution temperature and break up any gas pockets which forms on strip 12. Agitator 34 is comprised of an abrasive material which both agitates the pickling solution 32 and facilitates the removal of oxides from strip 12. Agitator 34 is preferably made of a material which does not react with pickling solution 32. Agitator 34 is preferably positioned to directly contact the moving strip 12 to enhance oxide removal.

The metal strip is preferably not in the pickling solution for more than 5 minutes so as to avoid pitting of the strip. Preferably, the pickling time is less than about two minutes and more than about five seconds. A pickling solution vent 36 is placed above pickling tank 30 to collect and remove acid fumes and other gasses escaping from pickling tank 30.

In an alternative embodiment of the present invention, strip 12 immediately enters a low oxygen gas environment 20 after exiting pickling tank 30. After strip 12 exits pickling tank 30, strip 12 is essentially absent of any surface oxides and is highly susceptible to oxidation with oxygen in the atmosphere. Low oxygen gas environment 20 shields the surface of strip 12 from atmospheric oxygen and prevents any oxides from forming. Stainless steel strip is highly susceptible to re-oxidation of the strip surface. Low oxygen environment 20 is preferably a low oxygen gas environment similar to the one previously discussed.

Pickling solution 32 is removed from strip 12 in rinse tank 40. Rinse tank 40 contains a rinse solution 42 which is heated water. The water in rinse tank 40 is deoxygenated by heating the water to above 100° and preferably about 110° F. Due to the slightly acidic nature of rinse solution 42, rinse solution 42 removes small amounts of oxides which still exist on the surface of strip 12. Rinse tank 40 is about 20 feet in length but can be longer or shorter depending on the rate of speed at which strip 12 is traveling. Rinse solution 42 is preferably agitated so as to facilitate the removal of pickling solution 32 from strip 12 and to enhance removal of small amounts of oxides. The agitators are preferably positioned in rinse tank 40 so as to be in contact with moving metal strip 12 to enhance the removal of pickling solution from strip 12. For metal strip other than stainless steel strip, the pickling process and rinse processes are optional processes. Various types of metal strips will need to be pickled and rinsed more or less than other types of metal strips. The pickling process and rinse process is also preferably used for carbon steel strip.

After strip 12 leaves rinse tank 40, strip 12 enters low oxygen liquid environment 50. Low oxygen liquid environment 50 consists of at least two spray jets 52, one located on each side of strip 12. Spray jets 52 inject a low oxygen-containing liquid 56 on the surface of strip 12 to prevent oxygen from reacting with the surface of strip 12. Spray jets 52 also remove any additional pickling solution 32 which are left on strip 12 after exiting rinse tank 40. Low oxygen-containing liquid 56 consists of heated water having a temperature of about 110° F. The low oxygen environment is an optional process for strip material other than stainless steel.

Strip 12, upon leaving low oxygen liquid environment 50, enters chemical activating tank 60. Chemical activating tank 60 contains a chemical activating solution 62, which further removes any oxides remaining on the surface of strip 12. Preferably, chemical activating solution 62 is a deoxidizing agent which includes a zinc chloride solution maintained at a temperature at least 60° F. The zinc chloride within chemical activating tank 60 not only removes lingering oxides on strip 12, but the zinc chloride acts as a protective temporary coating which prevents oxide formation on strip 12 until strip 12 enters coating tank 70. The temperature of the zinc chloride solution is preferably kept at a temperature of 60°–90° F. and agitated to maintain a uniform solution concentration. Small amounts of hydrochloric acid are preferably added to the deoxidizing solution to further enhance oxide removal. Preferably, the zinc chloride solution contains at least 5% zinc chloride. The chemical activating solution preferably includes 5–50% zinc chloride and 1–15% hydrochloric acid. Metal strip other than stainless steel, i.e. titanium strip, preferably bypass the chemical activation process. Furthermore, metal strips such as aluminum can be optionally treated with the chemical activation process as a substitute for the pickling and/or rinse processes.

Metal strip 12 is preferably coated with an intermediate metal layer after leaving chemical activation tank 60 and the application of the intermediate metal barrier layer is an optional process, not shown, but is preferably used for stainless steel strip prior to hot dip coating. The intermediate metal layer is preferably a single phase metal of tin, nickel, chromium or copper. The thickness of the layer is maintained such that it is an ultra-thin layer of not more than 3 microns ($1.18 \times 10^{-4}$ in.) and preferably has a thickness which is 1–3 microns. The plating of the metal strip can be used as a substitute for pre-treatment of the strip. As previously discussed, metal strip such as stainless steel strip need to be pre-treated to activate the surface of the strip, i.e. remove surface oxides prior to applying a hot dip metal alloy coating. Applicants have found that the applied intermediate metal layer, such as tin, chromium, nickel or copper, forms a strong bond with stainless steel strip and carbon steel strip whether or not the strip surface has been activated. The intermediate metal layer has also been found to strongly bond to the hot dip coated metal alloy such as a tin or tin and zinc alloy. Even though passivated stainless steel strip has successfully been coated with an intermediate layer and subsequently hot dipped with a single phase tin alloy and a two-phase tin and zinc alloy without activating the strip surface, the bonding of the intermediate metal layer to the strip is enhanced and the formation of a better intermetallic layer results when the strip surface is activated in the pre-treatment process described above. The plated layer has also been flow heated or pre-heated prior to hot dip coating. Flowing heating a strip plated with a metal such as tin causes a pseudo intermetallic layer to begin forming prior to the strip entering the molten coating alloy. The formation of the pseudo intermetallic layer ensures that a relatively high concentration of plated metal atoms are contained in the intermetallic layer. Pre-heating the plated strip, similar to pre-heating the strip, facilitates in the formation of the intermetallic layer especially for thick strip.

The application of a tin intermediate layer to the metal strip surface has been found to advantageously change the composition of the intermetallic layer, especially for metal coating alloys containing large amounts of metals other than tin such as in a two-phase tin-zinc coating alloy. Tin has been found to be a very important component of the intermetallic layer with respect to corrosion-resistance, metal alloy bonding and pliability. Higher tin concentrations in the intermetallic layer are obtained when the tin intermediate layer is applied to surfaces of the metal strip prior to hot dip coating. The tin intermediate layer also prevents the formation of a thick zinc layer in the intermetallic layer when zinc is included in the tin alloy. The formation of zinc intermetallic compounds in the intermetallic layer occurs at rates which are dependent on the nature of the metal strip (i.e. composition, passivated) and the time/temperature history of the coated strip during the coating process. The zinc intermetallic growth causes problems with dross formation and mechanical properties of the strip (i.e. rigidity of the coated layer) which results in poor coating quality or cracking of the coating during forming and bending. Extensive growth of the zinc intermetallic layer formations gives rise to localized corrosion, cracking of the coating, operational problems during coating, and adversely affects performance of the coated strip in its particular application. The tin intermediate layer is preferably plated by standard electroplating techniques, hot dip coated in a molten bath of tin or sprayed with on molten tin.

A chromium intermediate layer on the metal strip surface has been found to advantageously change the composition of the intermetallic alloy especially when the metal strip does not contain chromium. The chromium is preferably plated by standard electroplating techniques. Chromium has been found to combine with tin to form a highly corrosion-resistant barrier. Metal strip such as carbon steel plated with chromium results in the formation of an intermetallic layer containing iron, chromium and tin. This intermetallic layer composition has been found to be highly corrosion-resistant especially after the intermetallic layer has been oxidized as described in Assignee's U.S. Pat. No. 5,397,652 incorporated by reference herein. A modification of the invention includes flow heating or pre-heating the chromium plated layer prior to hot dip coating. The plating of a ferrous metal such as carbon steel converts the carbon steel into stainless steel as discussed above.

A copper intermediate layer on the strip surface enhances the corrosion-resistant properties of the coating alloy. The copper intermediate layer is preferably formed by standard electroplating techniques or by the addition of copper sulfate in the pickling solution. Copper also colors the metal alloy to reduce the reflectivity of the metal alloy. Plating of the copper onto the strip prior to hot dip coating also allows the copper to be incorporated into the molten alloy and intermetallic layer without having to maintain the copper in molten form. The copper plated strip may also be pre-heated prior to hot dip coating to enhance the formation of the intermetallic layer. Copper plating also inhibits zinc intermetallic formation for coating alloys containing zinc.

A nickel intermediate layer on the strip surface enhances the corrosion-resistance of the coated strip. The nickel intermediate layer is preferably applied by standard electroplating techniques. Plating the metal strip with nickel is also used to eliminate the need of the strip to be pretreated and activated prior to hot dip coating. The bond between the metal alloy coating and the nickel layer is surprisingly strong and durable and thereby inhibits the metal alloy coating from flaking especially when the metal strip is formed. The plating of the metal strip with the nickel layer is very desirable when the metal strip is used in an environment which has high concentrations of fluorine, chlorine and other halogens. Although the metal alloy coating significantly reduces the corrosive effects of halogens on the metal strip, it has been found that by placing a thin layer of plated nickel between the metal strip and the metal alloy coating, the corrosive effects of the halogens are even further reduced. The strip plated with nickel has also been found to improve the corrosion-resistance properties of the intermetallic layer during the hot dipping process by combining with the components of the intermetallic layer. Nickel plating also inhibits zinc intermetallic formation for coating alloys containing zinc.

Prior to strip 12 being coated with a molten metal alloy 76, strip 12 enters flux box 72 located in coating tank 70. Flux box 72 contains a flux 74 having a specific gravity less than that of molten metal alloy 76. Flux 74 consists of a zinc chloride and ammonia chloride solution. Preferably, flux 74 contains about 50% zinc chloride and about 8% ammonia chloride. Flux 74 is the final pre-treating process of strip 12 for removal of any remaining oxides on the surface of strip 12. Flux box 74 also acts as a barrier to oxygen and prevents oxides from forming on the surface of the molten metal alloy, which oxides interfere with proper coating of the metal strip.

Upon leaving flux box 72, strip 12 enters molten alloy 76. Coating tank 70 is maintained at a temperature several degrees above the melting point of metal alloy 76 so as to prevent solidification of metal alloy 76 as strip 12 enters coating tank 70. Molten metal alloy 76 in coating tank 70 is maintained at a temperature of preferably at least 10° F. above the melting point of metal alloy 76. Coating tank 70 is preferably 10–100 ft. in length so as to provide adequate residence time of the metal strip as it is passing through the coating tank. Longer coating tank lengths are employed for very fast moving strip. Coating tank 70 is divided into two chambers by barrier 80 so as to prevent protective material 78, such as palm oil, from spreading over the total surface of molten metal alloy 76 in coating tank 70. Molten metal alloy 76 is a single phase tin alloy or a two-phase tin and zinc alloy.

The single phase alloy system includes a large amount of tin. For the single phase tin alloy system, the tin content is greater than 75%. More preferably, the tin content of the single phase metal alloy is 90–99.95% weight percent of the single phase metal alloy. The lead content of the single phase metal alloy is not more than 0.50 weight percent. Preferably, the lead content is less than 0.1 weight percent and more preferably less than 0.05 weight percent and even more preferably less than 0.01 weight percent. A lead content of 0.001 or less is acceptable lead content to avoid any environmental or regulatory concerns. The high percentage of tin in the single phase metal alloy is substantially different from prior terne formulations containing 80% lead and 20% tin. The high concentrations of tin in the single phase metal alloy of the present invention substantially increases the uniformity and strength of the bond between the single phase metal alloy and the metal strip as compared with standard terne alloy coatings. The superior bonding characteristics of the single phase metal alloy makes the coating ideal for use with metal strip that are formed and shaped after being coated. Industrial grade tin can be used as the tin source for the metal alloy. Industrial grade tin is known to contain trace amounts of contaminants such as cobalt, nickel, silver and sulphur. It has been found that these elements do not adversely affect the corrosive resistive properties of the metal alloy so long as the weight percentages of these elements is small.

The two-phase zinc-tin metal alloy coating is a special combination of tin and zinc. It has been found that the addition of zinc in the amount of at least 10 weight percent of the tin-zinc alloy, the corrosion resistance of the two-phase metallic coating is enhanced in various types of environments as compared to a protective coating essentially composed of tin. The tin content of the two-phase metal alloy is significant to result in a two-phase alloy instead of a galvanizing coating metal. The tin is at least 15 weight percent of the alloy and preferably 15–90 weight percent of the metal alloy coating. The zinc content of the metal alloy is preferably the major component of the two-phase alloy; however, the zinc in the two-phase zinc-tin alloy can be as low as about 10 weight percent of the metal alloy and ranges from 10–85 weight percent of the metal alloy. The tin plus zinc content of the tin-zinc alloy is preferably greater than 75 weight percent and more preferably at least about 80 weight percent. Tin-zinc two-phase metal alloy coatings containing up to 90–100 weight percent tin plus zinc are also used.

As is well known in the art, a two-phase metal alloy system is a combination of two primary metals forming a composite alloy where each of the two-phase constituents maintain their own integrity (structure or composition) with one phase being a matrix surrounding distinct globules or phases of the second phase metal. The two-phase system is a dual strata of metal globules or phases, each globule or phase is distinct from the other in structure or composition. For a tin and zinc two-phase alloy as required by the invention, distinct zinc globules or phases are formed in a matrix comprising a eutectic mixture of tin-zinc. The globules or phases and matrix define layers or regions throughout the coating layer. A eutectic tin-zinc mixture is a tin rich mixture containing about 91 weight percent tin and about 9 weight percent zinc. For the defined tin rich matrix or phase and zinc rich globules or phases to form in a two-phase tin and zinc alloy, the zinc must make up over about 10 weight percent of the alloy. Zinc in excess of about 10 weight percent of the alloy causes the zinc to precipitate out of the tin-zinc eutectic mixture (tin rich phase) and form zinc globules or phases within the eutectic tin-zinc (tin rich) matrix. The tin content of the alloy must make up over about 15 weight percent of the alloy so that there is a sufficient amount of tin within the alloy to form the eutectic tin-zinc matrix to give the required two phase characteristics to the coating. Metal additives can be added to the two-phase tin and zinc alloy in small amounts without disturbing the two-phase structure of the alloy. The content of the metal additive must be controlled so that the metal additives mix with the metal alloy within the eutectic tin-zinc (tin rich) matrix and/or the zinc rich globules or phases without forming a third, fourth, fifth, etc. phase in the alloy and/or disrupting the eutectic tin-zinc (tin rich) matrix or the zinc rich globules or phases. When determining the composition of the two phase tin and zinc alloy of the present invention, the environment the coating is to be used in must be considered. In some situations, high tin is beneficial to limit the amount of zinc rich globules or phases in the two phase alloy. In other situations, it has been found that larger amounts of zinc should be added to increase the number and/or size of the zinc rich globules or phases within the two phase alloy. The addition of small metal additives such as copper, titanium or others to the binary system do not disrupt the eutectic tin-zinc (tin rich) matrix or phase or the zinc rich globules or phases of the two phase coating. The two phase coating is obtained by a continuous hot dipped process on a thin metal strip. By using this process to obtain the two phase characteristics of the invention, the advantages of the two-phase coating can be realized with coating thicknesses of less than about 0.003 inch. Only in this way can the strip be commercially viable.

The two-phase tin-zinc formulation oxidizes to form a colored coating which closely matches the popular grey, earth-tone color of weathered terne. The use of large weight percentages of zinc in the two-phase tin and zinc alloy does not cause the coating to become too rigid or brittle. The tin and zinc alloy alloys the coated material to be formed or bent and resists cracking or breaking as revealed by extensive experimentation performed on tin-zinc coatings having a zinc content from 10 to 85 weight percent. Is was found that a two-phase tin-zinc coating containing 10–85 weight percent zinc and essentially the balance tin produced an acceptably malleable coated material.

In accordance with another embodiment of the present invention, the metal alloy contains small amounts of other metals to modify the physical properties of the metal alloy to contribute to the strength of the metal alloy, to the corrosion-resistance of the metal alloy, to the color of the metal alloy, to the stability of the metal alloy and to the coating properties of the metal alloy. The secondary metals preferably constitute less than 25 weight percent of the metal alloy and more preferably less than 10 weight percent of the metal alloy.

In accordance with another embodiment of the invention, the single phase tin alloy and the two-phase tin and zinc alloy contains bismuth and antimony. The bismuth contained in the metal alloy ranges from 0.0 to 1.7 weight percent of the alloy and preferably up to about 0.5 weight percent. Antimony is added to the metal alloy in amounts from 0.0 to 7.5 weight percent. The metal alloy preferably contains bismuth and/or antimony since these two metals add to abrasive resistive properties of the metal alloy and prevent the tin in the metal alloy from crystallizing which results in flaking of the metal alloy from the metal strip. Tin begins to crystalize when the temperature drops below 56° F. (13.2° C.). Only small amounts of antimony or bismuth are needed to stabilize the tin and prevent the tin from crystallizing. Amounts of at least 0.01 weight percent have been found to adequately inhibit crystallization of the tin which results in the metal alloy prematurely flaking. For two-phase tin and zinc metal alloys, the amount of metallic stabilizer which properly inhibits crystallization of the tin within the two-phase coating is as low as at least 0.005 weight percent of the metal alloy. Antimony also improves the corrosion-resistance of the metal alloy. The addition of bismuth improves the mechanical properties of the metal alloy such as pliability, hardness and strength of the metal alloy.

In accordance with another embodiment of the invention, a coloring agent is added to the single phase tin alloy or the two-phase tin-zinc alloy to affect the color and reflectivity of the coated metal strip. Copper metal has been found to be an effective coloring agent to reduce the reflectiveness of the newly applied metal alloy by dulling the color of the metal alloy coating. The addition of a small amount of copper to the metal alloy also improves the corrosion-resistance of the metal alloy, especially in marine environments and for gasoline tanks. The copper addition to the metal alloy also positively affects other physical properties of the metal alloy such as act as a metallic stabilizer for the metal alloy, increase the pliability of the metal alloy. The copper content is added up to 5 weight percent of the metal alloy. Preferably, the copper content of the metal alloy does not exceed 2.7 weight percent. When copper is added to the metal alloy, copper content is added in amounts from 0.01 to 2.7 weight percent and preferably from 0.1 to 1.6 weight percent and more preferably from 1.0 to 1.5 weight percent. Copper is preferably added to the molten metal alloy in the form of brass.

In accordance with another embodiment of the invention, zinc metal is added to the single phase tin alloy metal alloy to increase the abrasion resistance of the metal alloy. Zinc metal is added to the metal alloy in weight percentage from 0.0–7.0. The amounts of zinc metal added will depend on the desired hardness of the metal alloy.

In accordance with another embodiment of the invention, small amounts of other metals, such as iron, aluminum, nickel, magnesium and/or titanium are added to the single phase tin alloy coating to strengthen and/or positively affect other physical properties of the metal alloy. When iron is contained in the metal alloy, the iron content preferably does not exceed 1.0 weight percent of the metal alloy. These other types of metals preferably constitute very small weight percentages with the metal alloy coating and preferably does not exceed more than 5% of the metal coating and more preferably is less than 2% of the metal alloy coating and more preferably less than 1% of the metal alloy coating. Cadmium has been found to adversely affect the corrosive resistive properties of the single phase tin alloy. Preferably the weight percentage of cadmium should be less than 0.05% cadmium.

In accordance with another embodiment of the invention, the two-phase tin and zinc alloy includes nickel. The two-phase tin and zinc alloy which contains nickel has exhibited increased corrosion resistance. The nickel additive in the two-phase metal alloy coating has been found to increase the corrosion-resistance of the two-phase metal alloy coating especially in alcohol and halogen containing environments. The nickel content of the two-phase metal alloy coating preferably does not exceed 5.0 weight percent. Larger nickel concentrations make the coated materials difficult to form. Preferably, the nickel content does not exceed 1.0 weight percent and more preferably 0.3–0.9 weight percent and even more preferably about 0.7 weight percent.

In accordance with another embodiment of the invention, magnesium is added to the two-phase tin and zinc alloy to improve the corrosion-resistance of the alloy. The tin-zinc alloy has anodic characteristics which attract negatively charged components such as oxygen, alcohols and halogens. These negatively charged components eventually react with the two-phase metal alloy which, in turn, causes the two-phase metal alloy to increase the rate of corrosion. It has been found that the addition of magnesium to the two-phase metal alloy reduces the anodic characteristics of the alloy thus increasing the corrosion-resistance of the two-phase metal alloy. The addition of magnesium also improves the flowability or viscous qualities of the molten tow-phase metal alloy to improve the ease of applying the two-phase metal alloy and uniformity of the two-phase metal alloy coating. The addition of magnesium to the molten two-phase metal alloy further reduces or eliminates the need of using a flux in coating tank 70. The magnesium content does not exceed 5.0 weight percent of the metal alloy. The magnesium is preferably not more than about 1.0 weight percent of the metal alloy and more preferably 0.1–0.4 weight percent of the metal alloy.

In accordance with another embodiment of the invention, the two-phase tin and zinc alloy contains titanium. Titanium has been found to positively affect the grain refinement of the two-phase to improve the bonding of the two-phase metal alloy to the metal material. A small grain size of the two-phase tin and zinc alloy has been found to form a stronger bond to the metal strip. Titanium in the metal alloy facilitates in the formation of a smaller grain size of the metal alloy. Titanium has also been found to reduce oxidation of the molten metal alloy and to reduce dross formation. The titanium content of the metal alloy preferably does not exceed 1.0 weight percent of the metal alloy. Preferably, the titanium content of the metal alloy is from 0.01–0.5%, and more preferably 0.01–0.15% of the metal alloy.

In accordance with another embodiment of the invention, aluminum is added to the single phase tin alloy and the two-phase tin and zinc alloy. Aluminum has been found to reduce oxidation of the molten two-phase metal alloy and to reduce dross formation. The aluminum also improves the bonding of the metal alloy to the metal material. The addition of aluminum reduces the formation of a Fe—Zn intermetallic layer when the two-phase alloy is coated on a ferrous metal strip thus improving the formability of ferrous metal coated strip. Aluminum further increases the luster of the coated metal alloy. In order to dull the color and reflectivity of the metal coating containing aluminum, a coloring and dulling agent such as copper should be added to the metal alloy when aluminum is added to the metal alloy. The amount of aluminum added to the metal alloy preferably does not exceed 5.0 weight percent of the metal alloy. Preferably, the aluminum content of the metal alloy is 0.01–1.0 weight percent, more preferably 0.01–0.5 weight percent and even more preferably 0.01–0.3 weight percent.

In the illustrated preferred embodiment, the metal strip is not preheated prior to coating. A thin metal strip need not be preheated since thin metal strips quickly heat to the temperature of the molten metal alloy. As the metal strip reaches equilibrium with the temperature in the coating tank, an intermetallic layer forms between the metal strip and the metal alloy coating. Metal strip up to about 0.03 inch thick is classified as thin metal strip and need not be preheated prior to coating. Applicants have found that non-preheated thin metal strip forms a high quality intermetallic layer 140. The absence of a preheating step simplifies the coating process and also makes the production of the coated metal strip more economical to manufacture. Although not required, thin metal strip have been preheated and such preheated strip still forms an intermetallic layer during coating. Metal strip having a thickness over 0.03 inch is considered a thick metal strip and is preferably preheated prior to coating. Thick metal strips do not always reach the proper equilibrium of temperature to form a proper intermetallic layer. Preheating the thick metal strip facilitates in the metal strip reaching or approaching temperature equilibrium so that a desirable intermetallic layer is formed.

As illustrated in FIG. 8, as the strip passes through coating tank 70, an intermetallic layer 140 is formed which assists in creating a strong bond between strip 12 and the metal alloy coating 142. The intermetallic layer is formed by metal alloy coating atoms molecularly intertwining with atoms on the surface of strip 12 as the temperature of the metal strip approaches the temperature of the molten metal alloy in the coating tank. The migration of the metal alloy coating atoms into the surface layer of strip 12 results in the formation of intermetallic layer 140. The thickness of the intermetallic layer is very thin and varies between 1–10 microns. For the coating of a stainless steel strip with a single phase tin alloy, intermetallic layer 140 is a molecular level alloy primarily of chromium, iron and tin, i.e. Cr—Fe—Sn. Intermetallic layer 140 can include nickel, zinc, iron, copper, chromium, tin, aluminum, lead, manganese, silicon, cadmium, titanium, magnesium, antimony, bismuth, hydrogen, nitrogen and/or oxygen and small amounts of other elements or compounds depending on the composition of strip 12 and molten alloy 76. Intermetallic layer 140 can be thought of as a transition layer between strip 12 and metal alloy coating 142. Intermetallic layer 140 is responsible for the strong bonding between metal alloy coating 142 and strip 12. The intermetallic layer also forms a corrosive-resistant layer. The residence time of strip 12 in coating tank 70 is preferably less than three minutes and preferably less than one minute and more preferably 5–30 seconds. The residence time is selected to properly form the intermetallic layer.

Figure 7:
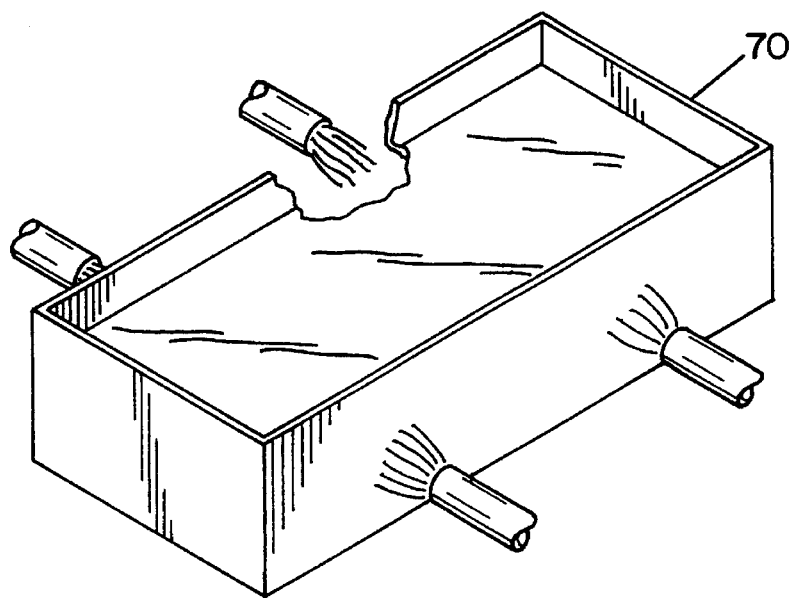
FIG. 7 is a prospective view of the coating tank heated by gas torches.

As illustrated in FIG. 7, coating tank 70 is preferably heated by four heating jets 71 directed at the outside sides of coating tank 70. The heating jets are preferably gas jets which heat molten metal alloy 76 in coating tank 70 to at least the temperature needed to melt the coating alloy. The temperature of the coating tank is preferably 449°–1000° F. and will depend on the composition of the coating alloys. Higher temperatures may be needed for different coating alloys, thus, additional heating jets, heating rods and/or heating coils can be used to heat coating tank 70. As discussed above, strip 12 is preferably not preheated as the strip enters coating tank 70, thus coating tank 70 is maintained at least several degrees above the melting point of metal alloy 76 to prevent the molten alloy from solidifying as the strip enters the molten alloy.

Referring now to FIGS. 2 and 3, strip 12 preferably passes between at least one set of coating rollers 82 prior to exiting coating tank 70. Coating rollers 82 maintain the desired metal alloy coating thickness on strip 12 and remove any excess metal alloy 76 from strip 12. The thickness of the metal alloy coating on strip 12 is preferably maintained between 0.0001 to 0.05 inch and more preferably above 0.0003 inch. The coating thickness is selected to ensure that the metal alloy coating has essentially no pin holes, such as created by electroplating, and does not shear when formed into products such as roofing materials, building materials gasoline tanks, filter casings and/or various other products formed from strip metal. The thickness of the metal alloy coating is preferably between 0.001 to 0.002 inch. When coating rollers are used, protective material 78 is preferably located near coating rollers 82. The protective material floats on top of molten metal alloy 76 to prevent the molten alloy from solidifying and oxidizing, reduces dross formation and also aids in properly distribution the metal alloy on strip 12.

In another alternative embodiment, FIG. 3 illustrates a metal coating jet 84 which injects molten metal alloy 76 on the outer surface of coating roller 82. Molten alloy 76 is spray jetted on coating roller 82 are pressed against strip 12 as strip 12 travels between coating roller 82 to fill in any small surface areas on strip 12 which have not been coated by the molten alloy in coating tank 70. Preferably two coating jets are used.

Figure 3A:
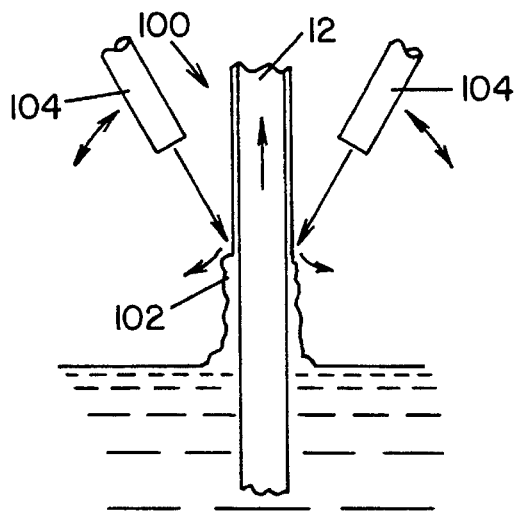
FIG. 3a illustrates a cross-sectional view of an alternative embodiment wherein air-knifes are used during the hot-dip coating of the metal strip.

In still another alternative embodiment, FIG. 3a illustrates an air-knife 100 which directs a high velocity gas toward metal alloy coating 76 on strip 12. Two or more blast nozzles 104 which are mutually opposed from each other and disposed over coating tank 70 direct high velocity gas 105 toward coated strip 12 and down into coating tank 70 as the strip continuously travels between the blast nozzles. The high velocity gas removes surplus molten metal alloy coating from the strip, smears the molten alloy on strip 12 to cover any pin holes, reduces the thickness of the metal alloy coating on said strip and reduce lumps or ribs in the metal alloy coating. The high velocity gas is preferably an inert gas so as not to induce oxidation of the molten metal alloy. Use of an inert gas also reduces dross formation on the metal alloy coating and acts as a protective barrier to air which causes viscous oxides to form on the surface of the molten metal alloy in coating tank 70. When inert gas is used, the use of a protective material on the coating tank is not required. Preferably the inert gas is nitrogen or an inert gas heavier (higher density) than air. The blast nozzles are preferably adjustable to direct the high velocity gas at various angles to the surface of the coated alloy to vary the amount of coating shaved off the strip. Though not shown, the blast nozzles are preferably enclosed in a box shaped sleeve which contains the inert gas after the gas contacts the strip and recirculates the inert gas back through the blast nozzles. When an air-knife is used, the air-knife is preferably used as a substitute for or in conjunction with coating rollers 82.

Figure 4:
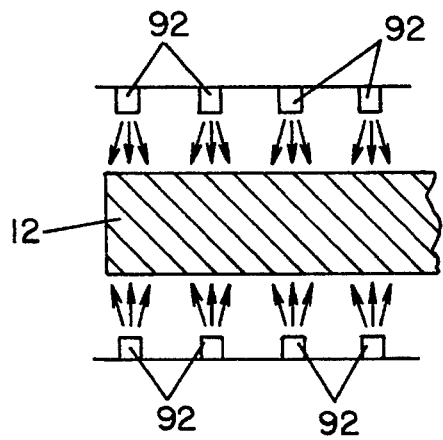
FIG. 4 is a schematic side view illustrating preferred embodiment for cooling the hot-dip coated metal strip by using cool water spray jets.
Figure 5:
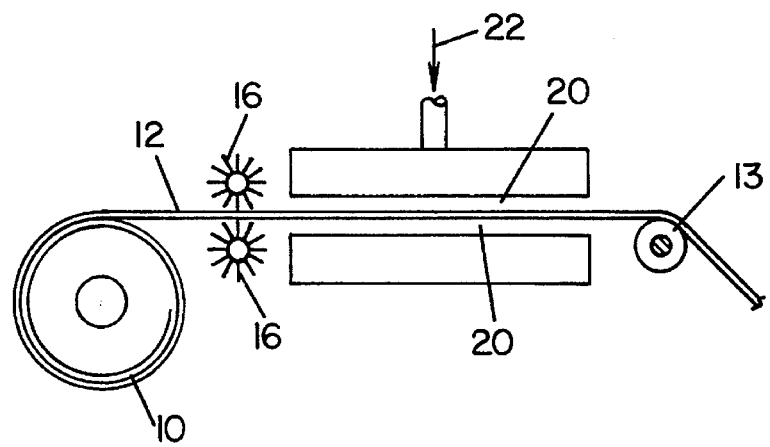
FIG. 5 illustrates a cross-sectional view of an alternative embodiment wherein abrasion treaters are used in conjunction with a low oxygen environment for pre-treatment of the metal strip.
Figure 6:
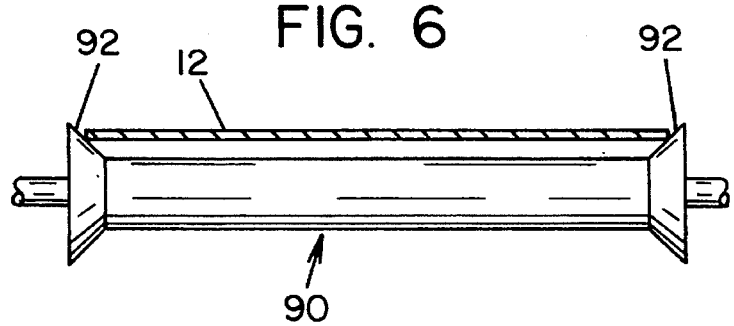
FIG. 6 is a frontal view of a camel-back guide.

After strip 12 exits coating tank 70 and coating rollers 82 and/or airknife 100, if used, the strip coated with the metal alloy coating is cooled by at least one cool water spray jet 92 as illustrated in FIG. 4 as strip 12 is guided by camel-back guides 90 as illustrated in FIG. 6. Camel-back guide 90 is designed such that it has two receding edges 92, formed by conical surfaces, which contact only the edges of strip 12 to minimize the removal of the metal alloy coating from strip 12. The water 93 from spray jet 92 is preferably maintained at ambient temperatures, but may be cooler or warmer in temperature. The velocity of the water in spray jet 92 is increased or decreased to vary the desired cooling rate of the molten metal alloy.

In an alternative embodiment, as illustrated in FIG. 2, strip 12 is cooled in a cooling tank 94 wherein strip 12 is immersed in cooling water 96. Cooling water 96 in cooling tank 94 is preferably maintained at ambient temperatures and is preferably agitated to increase the rate of cooling of the tin coating.

Rapid cooling of the alloy coating by either cooling tank 94 or cool water jet spray 92 is preferable so as to produce an alloy coating having fine grain size with increased grain density. Rapid cooling of the alloy coating also results in oxidation of the alloy coating surface to produce a less-reflective surface. The cooling time period is preferably less than two minutes and more preferably 10–30 seconds. As illustrated in Figure 1a, once the strip has been cooled, the strip is wound on strip roll 150 to be later processed and/or formed.

In an alternative embodiment, strip 12, after being cooled is subjected to leveler 100 as illustrated in Figure 1b. Leveler 100 includes several level rollers 102 which produce a uniform and smooth metal alloy coating 142 on strip 12. After strip 12 exits leveler 100, strip 12 is preferably cut by shear 111 into the desired strip lengths or rolled in strip roll 150.

In an alternative embodiment, strip 12 is coated with a pre-weather agent 112 as illustrated in FIG. 1b. The metal alloy coated strip 12 or cut sheets 130 are pre-weather coated by pre-weather coaters 114 which apply a pre-weather agent 112. Pre-weather agent 112 includes an asphalt-base paint which is applied at a thickness of approximately 1–2 mils. Preferably, coated sheets 130 or metal strip 12 are coated with a preweather agent 112 on both sides. The pre-weather coaters 114 have the pre-weather agent 112 applied either by pre-weather sprayer 116 and/or by rotating coaters 114 in pre-weather reservoir 110. The pre-weather agent 112 is rapidly dried by heat lamp 120 and/or by a dryer 122. The coated metal strip 12 or cut sheets 130 is rolled in strip roll 150, stacked in sheets for transport, or pre-formed into roofing materials, building materials, gas tanks, filters, etc.

In an alternative embodiment, FIG. 9 illustrates a metal strip 12 unwound from roll 10 and the strip proceeds directly into coating tank 70. The strip upon leaving coating tank 70 passes through coating rollers 82 and then through air-knife 100. After strip 12 passes air-knife 100, the coated strip is rewound on roll 150. This embodiment is used for metal strip such as carbon steel, tin, nickel alloys, titanium, bronze and copper. Stainless steel strip preferably should be pretreated and activated prior to coating.

In another alternative embodiment, the metal alloy coated strip proceeds from coating tank 70 or cooling tank 94 or spray jets 92 into an oxidizing tank, not shown. The oxidizing tank preferably contains an oxidizing solution which removes the metal alloy coating from strip 12 to expose intermetallic layer 140 and expose a corrosion resistant barrier at the surface of the intermetallic layer. The barrier has been found to be vastly superior in protecting against corrosion of a stainless steel strip. The oxidizing solution colors intermetallic layer 140. The oxidizing solution is preferably a solution of nitric acid. The nitric acid concentration is 5%–60% and is preferably about 25%. By increasing the concentration of the nitric acid, the time needed to remove metal alloy coating 76 is shortened. The removal of the metal alloy coating is generally less than two minutes. Copper sulfate is preferably added to the nitric acid to further increase the rate of removal of the alloy coating. Copper sulfate, when present, is added at a concentration of less than 10% and preferably 1% of the oxidizing solution. The temperature of the oxidizing solution must be maintained at a temperature that provides sufficient activity. The temperature is maintained between 30°–80° C. and preferably about 50° C. By increasing the temperature of the oxidizing solution, the activity of the oxidizing solution increases thereby shortening the time needed to remove the metal alloy coating from strip 12. The oxidizing tank preferably includes an agitator to prevent stagnation and/or vast concentration differences of the oxidizing solution in the tank and to prevent gas bubbles from forming on the surface of strip 12. Once the metal alloy coating is removed, the exposed intermetallic layer is preferably passivated to significantly enhance the corrosion-resistance of the intermetallic layer. The intermetallic layer is passivated by a passivating solution which preferably includes a nitrogen containing solution. Nitric acid is one type of passivating solution. When nitric acid is sued, the alloy coating removal and intermetallic layer passivation is both accomplished in a single oxidizing tank. Once the intermetallic layer is passivated, the passivated layer is not removed by the oxidizing solution, thus making the alloy coating removal and intermetallic layer passivation autocatalytic.

After strip 12 passes through the oxidizing tank, strip 12 preferably proceeds into an oxidizing rinse tank, not shown. The rinse tank contains a liquid which removes any remaining oxidizing solution from strip 12. Preferably, the liquid is water at ambient temperature. The rinse tank preferably includes an agitator to further assist in the removal of the oxidizing solution from strip 12. Strip 12 alternatively is rinsed off by spray jets instead of in a rinse tank. Once the rinse process is complete, the strip is rolled into strip roll 150, cut into sheets 130, or preformed to various articles. Alternatively, the oxidizing solution is applied subsequent to the preforming of the strip or sheets. For example, when roof materials are preformed from the strip or sheets, the roofing materials can be completely installed and soldered together and the oxidizing solution can then be sprayed or swabbed onto the roofing materials to expose and oxidize the intermetallic layer.

Examples of single phase tin alloys which contain a majority of tin and have exhibited the desired characteristics as mentioned above are set forth as follows:

| Alloy Ingredients | A | B | C | D | E | F | G |
| --- | --- | --- | --- | --- | --- | --- | --- |
| Antimony | ≦0.5 | ≦0.75 | ≦7.5 | ≦2.5 | ≦0.75 | ≦1.0 | — |
| Bismuth | ≦1.7 | ≦0.5 | — | — | ≦0.5 | ≦0.5 | ≦0.5 |
| Copper | — | — | ≦2.7 | ≦2.0 | — | — | — |
| Zinc | ≦0.001 | ≦0.5 | — | ≦0.5 | ≦0.5 | — | — |
| Lead | ≦0.05 | ≦0.05 | ≦0.05 | ≦0.5 | ≦0.05 | ≦0.05 | ≦0.05 |
| Iron | — | ≦0.1 | — | ≦1.0 | ≦0.1 | ≦0.1 | ≦0.1 |
| Tin | Bal. | Bal. | Bal. | Bal. | Bal. | Bal. | Bal. |

The formulation of the tin alloy prior to coating is 0.0–0.5% lead, 0.0–7.5% antimony, 0.0–1.7% bismuth, 0.0–5.0% copper, 0.0–1.0% iron, 0.0–7.0% zinc and the remainder tin. Preferably, the tin alloy coating includes 90–99.95% tin, 0.0–0.05% lead, 0.0–0.5% antimony and/or bismuth, 0.0–1.0% copper, 0.0–1.5% zinc. More preferably, the tin alloy includes 95–99.95% tin, 0.0–0.01% lead, 0.005–0.5% antimony, bismuth and/or copper, 0.0–0.5% zinc.

EXAMPLE A

A carbon steel strip is unwound from a roll of carbon steel strip and is pickled with a hydrochloric acid solution and chemically activated with a zinc chloride solution prior to coating. The carbon steel strip has a thickness of less than 0.03 inch. The strip is not pre-heated prior to coating. The metal alloy includes 90–95% tin and less than 0.5% lead. The metal is in a coated tank at a temperature of 460°–475° F. The coating tank is heated by four external gas torches directed to the outer sides of the coating tank. The strip is passed through the coating tank having a length of about 16 feet at a speed of about 100 ft/min and has a resident time in the coating tank of less than 10 seconds. The coated strip is passed through coating rollers and/or an air-knife to achieve a coating thickness of 0.0003–0.002 inch. The coated strip is then cooled and rewound into a roll of coated strip.

EXAMPLE B

A carbon steel strip is unwound from a roll of carbon steel strip and is pickled with a hydrochloric acid solution and chemically activated with a zinc chloride solution prior to coating. The carbon steel strip has a thickness of less than 0.03 inch. The carbon steel strip is plated with chromium of a thickness of less than 3 microns. The strip is not preheated prior to coating. The metal alloy is 90–99% tin and 0.01–1.0% metallic stabilizer selected from antimony, bismuth and/or copper, and less than 0.5% lead. The metal alloy is heated in a coated tank at a temperature of 460°–900° F. The coating tank is heated by four external gas torches directed to the outer sides of the coating tank. The strip is passed through the coating tank having a length of about 16 feet at a speed of about 100 ft/min and has a resident time in the coating tank of less than 10 seconds. The coated strip is passed through coating rollers and/or an air-knife to achieve a coating thickness of 0.0003–0.002 inch. The coated strip is then cooled and rewound into a roll of coated strip.

EXAMPLE C

A copper strip is unwound from a roll of copper strip and is pickled with a hydrochloric acid solution and chemically activated with a zinc chloride solution prior to coating. The copper strip has a thickness of less than 0.03 inch. The strip is not pre-heated prior to coating. The metal alloy is 90–99% tin, 0.0–1.0% metallic stabilizer and less than 0.1% lead. The metal alloy is heated in a coated tank at a temperature of 460°–475° F. The coating tank is heated by four external gas torches directed to the outer sides of the coating tank. The strip is passed through the coating tank having a length of about 16 feet at a speed of about 100 ft./min and has a resident time in the coating tank of less than 10 seconds. The coated strip is passed through coating rollers and/or an air-knife to achieve a coating thickness of 0.0003–0.002 inch. The coated strip is then cooled and rewound into a roll of coated strip.

EXAMPLE D

A carbon steel strip is unwound from a roll of carbon steel strip and plated with a nickel layer of a thickness of less than 3 microns. The carbon steel strip has a thickness of less than 0.03 inch. The strip is not pre-heated prior to coating. The metal alloy is 90–99% tin and less than 0.1% lead. The metal alloy is heated in a coated tank at a temperature of 460°–490° F. The coating tank is heated by four external gas torches directed to the outer sides of the coating tank. The strip is passed through the coating tank having a length of about 16 feet at a speed of about 100 ft/min and has a resident time in the coating tank of less than 10 seconds. The coated strip is passed through coating rollers and/or an air-knife to achieve a coating thickness of 0.0003–0.002 inch. The coated strip is then cooled and rewound into a roll of coated strip.

EXAMPLE E

A stainless steel strip is unwound from a roll of stainless steel strip and is aggressively pickled with a dual acid solution of hydrochloric acid and nitric acid and chemically activated with a zinc chloride solution. The stainless steel strip is plated with a nickel layer of microns thick. The stainless steel strip has a thickness of less than 0.03 inch. The strip is not pre-heated prior to coating. The metal alloy is 90–99% tin and is heated in a coated tank at a temperature of 460°–500° F. The coating tank is heated by four external gas torches directed to the outer sides of the coating tank. The strip is passed through the coating tank having a length of about 16 feet at a speed of about 100 ft/min and has a resident time in the coating tank of less than 10 seconds. The coated strip is passed through coating rollers and/or an air-knife to achieve a coating thickness of 0.0003–0.002 inch. The coated strip is then cooled and rewound into a roll of coated strip.

EXAMPLE F

A carbon steel strip is unwound from a roll of carbon steel strip and is pickled with a hydrochloric acid solution and a copper sulfate solution and chemically activated with a zinc chloride solution prior to coating. Copper was plated onto the strip surface during pickling to form a copper layer of 1–3 microns thick. The carbon steel strip has a thickness of less than 0.03 inch. The strip is not pre-heated prior to coating. The metal alloy includes 90–95% tin and less than 0.5% lead. The metal is in a coated tank at a temperature of 460°–475° F. The coating tank is heated by four external gas torches directed to the outer sides of the coating tank. The strip is passed through the coating tank having a length of about 16 feet at a speed of about 100 ft/min and has a resident time in the coating tank of less than 10 seconds The coated strip is passed through coating rollers and/or an air-knife to achieve a coating thickness of 0.0003–0.002 inch. the coated strip is then cooled and rewound into a roll of coated strip.

EXAMPLE G

A carbon steel strip is unwound from a roll of carbon steel strip and is pickled with a hydrochloric acid solution and chemically activated with a zinc chloride solution prior to coating. The carbon steel strip has a thickness of more than 0.03 inch. The strip is pre-heated prior to coating. The metal alloy is 90–99% tin and less than 0.1% lead. The coating tank is heated by four external gas torches directed to the outer sides of the coating tank. The strip is passed through the coating tank having a length of about 16 feet at a speed of about 100 ft/min and has a resident time in the coating tank of less than 10 seconds. The coated strip is passed through coating rollers and/or an air-knife to achieve a coating thickness of 0.0003–0.002 inch. The coated strip is then cooled and rewound into a roll of coated strip.

EXAMPLE H

A thin strip of carbon steel was uncoiled and passed through an electroplating bath for depositing an ultra thin layer of tin on the strip. The carbon steel strip had a thickness of less than 0.03 inch. Thereafter, the strip was processed in accordance with the invention to provide a two-phase zinc-tin coating on the moving strip conveyed at a speed to produce an intermetallic layer between the alloy and the base strip. The tin-zinc coating is a two-phase alloy wherein the tin and zinc content of the alloy coating is at least 75 weight percent.

The formulation of the tin-zinc coating is as follows:

| | |
|---|---|
| Tin | 15–90 |
| Zinc | 10–85 |
| Magnesium | 0.0–5 |
| Nickel | 0.0–5 |
| Copper | 0.0–5 |
| Titanium | 0.0–1.0 |
| Aluminum | 0.0–5.0 |
| Antimony | 0.0–7.5 |
| Bismuth | 0.0–1.7 |
| Iron | 0.0–1.0 |
| Lead | 0.0–1.0 |

EXAMPLE I

The process of Example H was performed with the addition of a heating furnace between the electrolytic bath and the coating bath to flow thin tin and, thus, form an alloy of iron and tin over the strip before the coating step.

EXAMPLE J

The process of Example H was performed with copper being plated on the moving strip and the electrolytic bath. This copper was heated to an alloying temperature in the molten alloy bath of the coating stage of the process.

EXAMPLES K–M

Processes H, I and J were each performed with the thin moving metal strip being stainless steel.

The thickness of the single phase tin alloy and the two-phase tin and zinc alloy is varied depending on the environment in which the treated roofing system is used. Both the single phase and two-phase alloys exhibit superior corrosive resistant properties in rural environments, industrial and marine environments. The metal alloy coating is preferably applied in a thickness between 0.0001–0.05 inch. Preferably, the metal alloy coating thickness is at least 0.0003 inch and more preferably 0.001–0.002 inch. Such a metal alloy coating thickness has been found to be adequate to prevent and/or significantly reduce the corrosion of the metal strip in virtually all types of environments. Metal alloy coatings having thicknesses greater than 0.002 can be used in harsh environments to provide added corrosion protection.

The metal alloy is designed to be used in all types of metal strip applications. The metal alloy strip can be used for standing seam and press fit (mechanical joining, see assignee's U.S. Pat. No. 4,987,716 patent) applications for roofing. In standing seam applications, the edges of the roofing materials are folded together and then soldered to form a water tight seal. The metal alloy inherently includes excellent soldering characteristics. When the metal alloy is heated, it has the necessary wetting properties to produce a tight water resistant seal. As a result, the metal alloy acts as both a corrosive resistive coating and a soldering agent for standing seam roofing systems. The metal alloy coated can be also welded with standard solders. Typical solders contain about 50% tin and 50% lead. The metal alloy has the added advantage of also being able to be soldered with low or no-lead solders. The metal alloy coated roofing materials also can be used in mechanically joined roofing systems due to the malleability of the metal alloy. Mechanically joined systems form water tight seals by folding adjacent roof material edges together and subsequently applying a compressive force to the seam in excess of 1,000 psi. Under these high pressures, the metal alloy plasticly deforms within the seam and produces a water tight seal.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus described the invention the following is claimed:

1. A thin metal strip of a metal selected from the group consisting of carbon steel, stainless steel, copper, nickel alloys, tin, titanium, coated in a continuous, hot-dip process having an ultra-thin intermediate metal layer of a metal selected from the group consisting of nickel, chromium, zinc, copper or tin applied to the surface of said strip and a coating of corrosive-resistant metallic coating coated onto said intermediate metal barrier layer, said coating comprising at least about 15 weight percent tin, at least about 10 weight percent zinc, less than 1.0 weight percent lead and an effective amount of metallic stabilizer selected from the group consisting of antimony, bismuth, copper and mixtures thereof.

2. A coated metal strip as defined in claim 1, wherein said coating is a two phase alloy of tin and zinc with the zinc in a tin rich matrix comprising:

| | |
|---|---|
| Tin | 15–90 |
| Zinc | 10–85 |
| Magnesium | 0.0–5 |
| Nickel | 0.0–5 |
| Copper | 0.0–5 |
| Titanium | 0.0–1 |
| Aluminum | 0.0–5 |
| Antimony | 0.0–7.5 |
| Bismuth | 0.0–1.7 |
| Iron | 0.0–1.0 |
| Lead | 0.0–0.5. |

3. A coated metal strip as defined in claim 2, wherein said coating includes at least one metal additive selected from the group consisting of nickel, magnesium, titanium, aluminum, manganese, silicon, cadmium, lead, copper, iron, antimony, bismuth and mixtures thereof.

4. A coated metal strip as defined in claim 3, wherein the lead content of said coating is not more than 0.01 weight percent.

5. A coated metal strip as defined in claim 4, wherein said ultra-thin intermediate metal layer on said strip is heated prior to said strip being hot dip coated.

6. A coated metal strip as defined in claim 5, wherein said ultrathin intermediate layer is tin.

7. A coated metal strip as defined in claim 2, wherein the thickness of said coating is at least 0.0001 inch.

8. A coated metal strip as defined in claim 2, wherein said ultra-thin metal intermediate layer is plated onto said metal strip and has a thickness of up to 3 microns.

9. A coated metal strip as defined in claim 2, wherein said ultra-thin intermediate layer is copper.

10. A coated metal strip as defined in claim 2, wherein said ultra-thin intermediate layer is chromium.

11. A coated metal strip as defined in claim 1, wherein said coating includes at least one metal additive selected from the group consisting of nickel, magnesium, titanium, aluminum, manganese, silicon, cadmium, lead, copper, iron, zinc, antimony, bismuth and mixtures thereof.

12. A coated metal strip as defined in claim 1, wherein the lead content of said coating is not more than 0.01 weight percent.

13. A coated metal strip as defined in claim 12, wherein said ultra-thin metal intermediate layer is plated onto said metal strip and has a thickness of up to 3 microns.

14. A coated metal strip as defined in claim 1, wherein the thickness of said coating is at least 0.0001 inch.

15. A coated metal strip as defined in claim 1, wherein said ultra-thin metal intermediate layer is plated onto said metal strip and has a thickness of up to 3 microns.

16. A coated metal strip as defined in claim 1, wherein metal strip is an alloy of iron with an alloying metal selected from the group consisting of chromium, nickel, carbon, molybdenum, silicon, manganese, titanium, boron, copper, aluminum and mixtures thereof.

17. A coated metal strip as defined in claim 1, including an intermetallic layer formed between the surface of said strip and said hot dip coating, said intermetallic layer having a thickness of 1–10 microns.

18. A coated metal strip as defined in claim 1, wherein said ultra-thin metal intermediate layer is plated onto said metal strip and has a thickness of up to 3 microns.

19. A coated metal strip as defined in claim 18, wherein said ultra-thin intermediate metal layer on said strip is heated prior to said strip being hot dip coated.

20. A coated metal strip as defined in claim 19, wherein said ultra-thin intermediate layer is tin.

21. A coated metal strip as defined in claim 1, wherein said ultra-thin intermediate layer is copper.

22. A coated metal strip as defined in claim 1, wherein said ultra-thin intermediate layer is chromium.

23. A coated metal strip having a thickness of 0.005–0.2 inch and supplied from a coil and plated with an intermediate metal layer of up to 3 microns thick, and coating said plated strip by continuously passing said plated strip in a longitudinal direction at a speed through a molten bath of metal alloy having a temperature of at least 449° F. such that the residence time of said plated strip in said molten bath is 0.166–10 minutes to deposit an impervious layer of said metal alloy on the surface of said plated strip and form an intermetallic layer between said strip surface and said coating, said coating having a generally uniform thickness of 0.0001–0.05 inch along the length of said strip and including at least about 15 weight percent tin, at least about 10 weight percent zinc and an effective amount of metallic stabilizer selected from the group consisting of antimony, bismuth, copper and mixtures thereof, said intermetallic layer having a thickness of 1–10 microns and comprising a heat created multi-phase interface alloy created from a mixture of said metal strip, said intermediate metal barrier layer and said metal alloy.

24. A coated metal strip as defined in claim 23, wherein said residence time in said molten alloy is less than one minute.

25. A coated metal strip as defined in claim 23, wherein said intermetallic layer includes iron and tin.

26. A coated strip as in claim 23, wherein said continuous hot dipped procedure has an operation line speed such that the residence time of said strip in said molten bath is less than one minute.

27. A coated metal strip as defined in claim 23, wherein said strip is stainless steel.

28. A coated metal strip as defined in claim 27, wherein said intermediate metal layer is chromium.

29. A coated metal strip as defined in claim 27, wherein said intermediate metal layer is copper.

30. A coated metal strip as defined in claim 27, wherein said intermediate metal layer is tin.

31. A coated metal strip as defined in claim 23, wherein said strip is copper.

32. A coated metal strip as defined in claim 31, wherein said intermediate metal layer is chromium.

33. A coated metal strip as defined in claim 31, wherein said intermediate metal layer is copper.

34. A coated metal strip as defined in claim 31, wherein said intermediate metal layer is tin.

35. A coated metal strip as defined in claim 23, wherein said intermediate metal layer is chromium.

36. A coated metal strip as defined in claim 23, wherein said intermediate metal layer is copper.

37. A coated metal strip as defined in claim 23, wherein said intermediate metal layer s tin.

38. A coated metal strip formed of a metal strip selected from the group consisting of carbon steel, stainless steel, copper, nickel alloys, tin, aluminum, bronze and titanium, said metal strip having a thickness of about 0.005–0.2 inch and supplied from a coil and plated with an intermediate metal layer of at least about 1 micron thick and of a metal selected from the group consisting of chromium, copper, nickel, tin or zinc, said metal strip and said ultra-thin intermediate layer heated prior to hot dip coating said metal strip, and coating said heated plated metal strip by continuously passing said heated plated strip in a longitudinal direction at a speed through a molten bath of metal alloy having a temperature of at least about 449° F. such that the residence time of said heated plated metal strip in said molten bath is about 0.166–10 minutes to deposit an impervious layer of said metal alloy on the surface of said heated plated strip and forming an intermetallic layer between said strip surface and said coating, said coating having a generally uniform thickness of at least about 0.0001 inch along the length of said strip, said intermetallic layer having a thickness of about 1–10 microns and comprising a heat created multi-phase interface alloy created from a mixture of said metal strip, said intermediate metal layer and said metal alloy, said coating comprising at least about 15 weight percent tin, at least about 10 weight percent zinc, up to about 1.0 weight percent lead, and at least an effective amount of metallic stabilizer selected from the group consisting of antimony, bismuth, copper or mixtures thereof.

* * * * *

UNITED STATES PATENT AND TRADEMARK OFFICE
CERTIFICATE OF CORRECTION

PATENT NO. : 5,491,036
DATED : 02-13-96
INVENTOR(S) : Jay F. Carey, II & Mehrooz Zamanzadeh It is certified that error appears in the above-identified patent and that said Letters Patent is hereby corrected as shown below:

On the title page, item [63],

Delete all information and substitute the following: --Continuation-in-part of Ser. No. 380,372, Jan. 30, 1995, Pat. No. 5,480,731, which is a continuation of Pat. No. 5,395,703, which is a continuation of Pat. No. 5,314,758. Also, a continuation-in-part of Ser. No. 175,523, Dec. 30, 1993, Pat. No. 5,401,586, which is a continuation-in-part of Ser. No. 154,376, Nov. 17, 1993, abandoned, which is a continuation of Ser. No. 042,649, Apr. 5, 1993, abandoned. Also, a continuation-in-part of Ser. No. 165,085, Dec. 10, 1993, Pat. No. 5,397,652, which is a continuation-in-part of Ser. No. 000,101, Jan. 4, 1993, abandoned, which is a continuation-in-part of Pat No. 5,314,758. Also, a continuation-in-part of Ser. No. 260,333, June 15, 1994, Pat. No. 5,492,882, which is a continuation-in-part of Ser. No. 209,400, Mar. 14, 1994, abandoned, which is a continuation-in-part of Pat. No. 5,401,586, which is a continuation-in-part of Ser. No. 154,376, Nov.17, 1993, abandoned, which is a continuation of Ser. No. 042,649, Apr. 5, 1993, abandoned. Also, a continuation-in-part of Ser. No. 341,365, Nov. 17, 1994, Pat. No. 5,489,490, which is a continuation-in-part of Pat. No. 5,401,586, which is a continuation-in-part of Ser. No. 154,376, Nov. 17, 1993, abandoned, which is a continuation of Ser. No. 042,649, Apr. 5, 1993, abandoned. Also, a continuation-in-part of Ser. No. 347,261, Nov. 30, 1994, Pat. No. 5,491,035, which is a continuation-in-part of Pat. No. 5,401,586, which is a continuation-in-part of Ser. No. 154,376, Nov. 17, 1993, abandonded, which is a continuation of Ser. No. 042,649, Apr. 5, 1993, abandoned.--

UNITED STATES PATENT AND TRADEMARK OFFICE
CERTIFICATE OF CORRECTION

PATENT NO. : 5,491,036
DATED : 02-13-96
INVENTOR(S) : Jay F. Carey, II & Mehrooz Zamanzadeh It is certified that error appears in the above-identified patent and that said Letters Patent is hereby corrected as shown below:

Column 1, delete lines 3-19 and substitute therefore ---This patent application is a continuation-in-part of co-pending United States Patent Application Serial No. 380,372, filed January 30, 1995, now United States Letters Patent No. 5,480,731, which in turn is a continuation of United States Letters Patent No. 5,395,703, which in turn is a continuation of United States Letters Patent No. 5,314,758.

This patent application is also a continuation-in-part of co-pending United States Patent Application Serial No. 175,523, filed December 30, 1993, now United States Letters Patent No. 5,401,586, which in turn is a continuation-in-part of United States Patent Application Serial No. 154,376, filed November 17, 1993, now abandoned, which in turn is a continuation of United States Patent Application Serial No. 042,649 filed April 5, 1993, now abandoned.

This patent application is further a continuation-in-part of co-pending United States Patent Application Serial No. 165,085, filed December 10, 1993, now United States Letters Patent No. 5,397,652, which in turn is a continuation-in-part of United States Patent Application Serial No. 000,101, filed January 4, 1993, now abandoned, which in turn is a continuation-in-part of United States Letters Patent No. 5,314,758.

UNITED STATES PATENT AND TRADEMARK OFFICE
CERTIFICATE OF CORRECTION

PATENT NO. : 5,491,036
DATED : 02-13-96
INVENTOR(S) : Jay F. Carey, II & Mehrooz Zamanzadeh It is certified that error appears in the above-identified patent and that said Letters Patent is hereby corrected as shown below:

This patent application is still further a continuation-in-part of co-pending United States Patent Application Serial No. 260,333, filed June 15, 1994, now United States Letters Patent No. 5,492,882, which in turn is a continuation-in-part of United States Patent Application Serial No. 209,400, filed March 14, 1994, now abandoned, which in turn is a continuation-in-part of United States Letters Patent No. 5,401,586, which in turn is a continuation-in-part of United States Patent Application Serial No. 154,376, filed November 17, 1993, now abandoned, which in turn is a continuation of United States Patent Application Serial No. 042,649 filed April 5, 1993, now abandoned.

This patent application is also a continuation-in-part of co-pending United States Patent Application Serial No. 341,365, filed November 17, 1994, now United States Letters Patent No. 5,489,490, which in turn is a continuation-in-part of United States Letters Patent No. 5,401,586, which in turn is a continuation-in-part of United States Patent Application Serial No. 154,376, filed November 17, 1993, now abandoned, which in turn is a continuation of United States Patent Application Serial No. 042,649, filed April 5, 1993, now abandoned.

UNITED STATES PATENT AND TRADEMARK OFFICE
CERTIFICATE OF CORRECTION

PATENT NO. : 5,491,036
DATED : 02-13-96
INVENTOR(S) : Jay F. Carey, II & Mehrooz Zamanzadeh It is certified that error appears in the above-identified patent and that said Letters Patent is hereby corrected as shown below:

This patent application is yet also a continuation-in-part of co-pending United States Patent Application Serial No. 347,261, filed November 30, 1994, now United States Letters Patent No. 5,491,035, which in turn is a continuation-in-part of United States Letters Patent No. 5,401,586, which in turn is a continuation-in-part of United States Patent Application Serial No. 154,376, filed November 17, 1993, now abandoned, which in turn is a continuation of United States Patent Application Serial No. 042,649 filed April 5, 1993, now abandoned.---; and

UNITED STATES PATENT AND TRADEMARK OFFICE
CERTIFICATE OF CORRECTION

PATENT NO. : 5,491,036
DATED : 02-13-96
INVENTOR(S) : Jay F. Carey, II & Mehrooz Zamanzadeh It is certified that error appears in the above-identified patent and that said Letters Patent is hereby corrected as shown below:

Column 1, delete lines 44-47 and substitute therefore ---pending United States Patent Application Serial No. 260,333, filed June 15, 1994, now United States Letters Patent No. 5,492,882; co-pending United States Patent Application Serial No. 341,365, filed November 17, 1994, now United States Letters Patent No. 5,489,490; co-pending United States Patent Application Serial No. 347,261, filed November 30, 1994, now United States Letters Patent No. 5,491,035; and co-pending United States Patent Application Serial No. 373,533, filed January 17, 1995, now United States Letters Patent No. 5,455,122,---.

Signed and Sealed this

Second Day of February, 1999

Attest:

Attesting Officer

*Acting Commissioner of Patents and Trademarks*

UNITED STATES PATENT AND TRADEMARK OFFICE
CERTIFICATE OF CORRECTION

| | |
|---|---|
| PATENT NO. | : 5,491,036 |
| DATED | : February 13, 1996 |
| INVENTOR(S) | : Carey, II et al. |

It is certified that error appears in the above-identified patent and that said Letters Patent is hereby corrected as shown below:

Title page,
Item [63], should read as follows:

-- Continuation-in-part of Ser. No. 08/380,372, January 30, 1995, Pat. No. 5,480,731, which is a continuation of Ser. No. 08/153,026, Nov. 17, 1993, Pat. No. 5,395,703, which is a divisional of Ser. No. 07/858,662, Mar. 27, 1992, Pat. No. 5,314,758. Also, a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/165,085, Dec. 10, 1993, Pat. No. 5,397,652, which is a continuation-in-part of Ser. No. 08/000,101, Jan. 4, 1993, abandoned, which is a continuation-in-part of Ser. No. 07/858,662, Mar. 27,1992, Pat. No. 5,314,758. Also, a continuation-in-part of Ser. No. 08/260,333, Jun. 15, 1994, Pat. No. 5,429,882, which is a continuation-in-part of Ser. No. 08/209,400, Mar. 14, 1994, abandoned, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/341,365, Nov. 17, 1994, Pat. No. 5,489,490, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned.

Also, a continuation-in-part of Ser. No. 08/347,261, Nov. 30, 1994, Pat. No. 5,491,035, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/165,085, Dec. 10, 1993, Pat. No. 5,401,586, which is a continuation-in-part of Ser. No. 08/000,101, Jan. 4, 1993, abandoned, which is a continuation-in-part of Ser. No. 07/967,407, Oct. 26, 1992, abandoned, which is a continuation-in-part of Ser. No. 07/913,209, Jul. 15, 1992, abandoned, which is a continuation-in-part of Ser. No. 07/858,662, Mar. 27, 1992, Pat. No. 5,314,758. --

UNITED STATES PATENT AND TRADEMARK OFFICE
CERTIFICATE OF CORRECTION

| | |
|---|---|
| PATENT NO. | : 5,491,036 |
| DATED | : February 13, 1996 |
| INVENTOR(S) | : Carey, II et al. |

It is certified that error appears in the above-identified patent and that said Letters Patent is hereby corrected as shown below:

Column 1,
Delete lines 3-19, and substitute the following:

-- This patent application is a continuation-in-part of Serial No. 08/380,372 filed January 30, 1995, now Patent No. 5,480,731, which is in turn a continuation of Serial No. 08/153,026 filed November 17,1993, now Patent No. 5,395,703, which in turn is a divisional of Serial No. 07/858,662 filed March 27, 1992, now Patent No. 5,314,758.

This patent application is also a continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

This patent application is further a continuation-in-part of Serial No. 08/165,085 filed December 10, 1993, now Patent No. 5,397,652, which in turn is a continuation-in-part of Serial No. 08/000,101 filed January 4, 1993, now abandoned, which in turn is a continuation-in-part of Serial No. 07/858,662 filed March 27, 1992, now Patent No. 5,314,758.

This patent application is still further a continuation-in-part of Serial No. 08/260,333 filed June 15, 1994, now Patent No. 5,429,882, which in turn is a continuation-in part of Serial No. 08/209,400 filed March 14, 1994, now abandoned, which in turn is a continuation-in-part of Serial No. 08/175,523 filed December 30,1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

This patent application is yet still further a continuation-in-part of Serial No. 08/341,365 filed November 17,1994, now Patent No. 5,489,490, which in turn is a continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

UNITED STATES PATENT AND TRADEMARK OFFICE
CERTIFICATE OF CORRECTION

PATENT NO. : 5,491,036
DATED : February 13, 1996
INVENTOR(S) : Carey, II et al.

It is certified that error appears in the above-identified patent and that said Letters Patent is hereby corrected as shown below:

This patent application is also a continuation-in-part of Serial No. 08/347,261 filed November 30, 1994, now Patent No. 5,491,035, which in turn is a continuation-in-part of Serial No. 08/175,523 filed December 30, 1993, now Patent No. 5,401,586, which in turn is a continuation-in-part of Serial No. 08/154,376 filed November 17, 1993, now abandoned, which in turn is a continuation of Serial No. 08/042,649 filed April 5, 1993, now abandoned.

This patent application is further a continuation-in-part of Serial No. 08/165,085 filed December 10,1993, now Patent No. 5,401,586, which in turn is a continuation-in-part of Serial No. 08/000,101 filed January 4, 1993, now abandoned, which in turn is a continuation-in-part of Serial No. 07/967,407 filed October 26, 1992, now abandoned, which in turn is a continuation-in-part of Serial No. 07/913,209 filed July 15, 1992, now abandoned, which in turn is a continuation-in-part of Serial No. 07/858,662 filed March 27, 1992, now Patent No. 5,314,758.

Delete lines 44-47, and substitute the following:
--    pending United States Application Serial No. 260,333, filed June 15, 1994, now United States Letters Patent No. 5,429,882; co-pending United States Patent Application Serial No. 341,365, filed November 17, 1994, now United States Letters Patent No. 5,489,490; co-pending United States Patent Application Serial No. 347,261, filed November 30, 1994, now United States Letters Patent No. 5,491,035; and co-pending United States Patent Application Serial No. 373,533, filed January 17,1995, now United States Letters Patent No. 5,455,122. --

This certificate supersedes Certificate of Correction issued February 2, 1999.

Signed and Sealed this

Sixth Day of August, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 5,491,036  
DATED : February 13, 1996  
INVENTOR(S) : Carey, II et al.

Page 1 of 2

It is certified that error appears in the above-identified patent and that said Letters Patent is hereby corrected as shown below:

<u>Title page,</u>
Item [63], the following Related U.S. Application Data, should be substituted, for the Related U.S. Application Data in the printed patent and the substituted Related U.S. Application Data in Certificates of Correction issued on February 2, 1999 and August 6, 2002.

Continuation-in-part of Ser. No. 08/380,372, January 30, 1995, Pat. No. 5,480,731, which is a continuation of Ser. No. 08/153,026, Nov. 17, 1993, Pat. No. 5,395,703, which is a divisional of Ser. No. 07/858,662, Mar. 27, 1992, Pat. No. 5,314,758. Also, a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/165,085, Dec. 10, 1993, Pat. No. 5,397,652, which is a continuation-in-part of Ser. No. 08/000,101, Jan. 4, 1993, abandoned, which is a continuation-in-part of Ser. No. 07/858,662, Mar. 27, 1992, Pat. No. 5,314,758. Also, a continuation-in-part of Ser. No. 08/260,333, Jun. 15, 1994, Pat. No. 5,429,882, which is a continuation-in-part of Ser. No. 08/209,400, Mar. 14, 1994, abandoned, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/341,365, Nov. 17, 1994, Pat. No. 5,489,490, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/347,261, Nov. 30, 1994, Pat. No. 5,491,035, which is a continuation-in-part of Ser. No. 08/175,523, Dec. 30, 1993, Pat. No. 5,401,586, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/165,085, Dec. 10, 1993, Pat. No. 5,401,586, which is a continuation-in-part of Ser. No. 08/000,101, Jan. 4, 1993, abandoned, which is a continuation-in-part of Ser. No. 07/967,407, Oct. 26, 1992, abandoned, which is a continuation-in-part of Ser. No. 07/913,209, Jul. 15, 1992, abandoned, which is a continuation-in-part of Ser. No. 07/858,662, Mar. 27, 1992, Pat. No. 5,314,758. Also, a continuation-in-part of Serial No. 08/373,533, Jan. 17, 1995, Pat. No. 5,455,122, which is a continuation of Ser. No. 08/254,875, Jun. 6, 1994, abandoned, which is a divisional of Ser. No. 08/209,400, Mar. 14, 1994, abandoned, which is a continuation-in-part of Ser. No. 08/154,376, Nov. 17, 1993, abandoned, which is a continuation of Ser. No. 08/042,649, Apr. 5, 1993, abandoned. Also, a continuation-in-part of Ser. No. 08/347,261, Nov. 30, 1994, Pat. No. 5,491,035, which is a continuation-in-part of Ser.

UNITED STATES PATENT AND TRADEMARK OFFICE
CERTIFICATE OF CORRECTION

PATENT NO. : 5,491,036
DATED : February 13, 1996
INVENTOR(S) : Carey, II et al.

It is certified that error appears in the above-identified patent and that said Letters Patent is hereby corrected as shown below:

Title page (cont'd),
No. 08/175,523, Dec. 30, 1993, Pat. No. 5,401,586, which is a continuation-in-part of Ser. No. 08/254,875, Jun. 6, 1994, abandoned, which is a divisional of Ser. No. 08/209,400, Mar. 14, 1994, abandoned, which is a continuation-in-part of Ser. No. 08/154,376, Nov. 17, 1993, abandoned, which is a continuation of Ser. No. 08/042,649, Apr. 5, 1993, abandoned.

Column 1,
Lines 3-19, the following paragraphs are to be inserted prior to the paragraph being with the phrase "The present invention relates to the art of coated metal strip and more particularly":

This patent application is still further a continuation-in-part of Serial No. 08/373,533 filed January 17, 1995, now Patent No. 5,455,122, which in turn is a continuation of Serial No. 08/254,875 filed June 6, 1994, now abandoned, which in turn is a divisional of Serial No. 08/209,400 filed March 14, 1994, now abandoned, which in turn is a continuation-in-part of Serial No. 08/154,376 filed November 17, 1993, now abandoned, which in turn is a continuation of Serial No. 08/042,649 filed April 5, 1993, now abandoned.

This patent application is yet further a continuation-in-part of Serial No. 08/347,261 filed November 30, 1994, now Patent No. 5,491,035, which in turn is a continuation-in-part of Serial No. 08/175,523 filed December 30, 1993, now Patent No. 5,401,586, which is a continuation-in-part of Ser. No. 08/254,875 filed June 6, 1994, now abandoned, which in turn is a divisional of Serial No. 08/209,400 filed March 14, 1994, now abandoned, which in turn is a continuation-in-part of Serial No. 08/154,376 filed November 17, 1993, now abandoned, which in turn is a continuation of Serial No. 08/042,649 filed April 5, 1993, now abandoned.

Signed and Sealed this

Twenty-sixth Day of August, 2003

JAMES E. ROGAN
*Director of the United States Patent and Trademark Office*